(12) United States Patent
Williams et al.

(10) Patent No.: US 7,913,664 B2
(45) Date of Patent: Mar. 29, 2011

(54) ALTERNATE FUEL BLENDING SYSTEM AND ASSOCIATED METHOD

(76) Inventors: Rodger K. Williams, Siler City, NC (US); Edward A. Payne, Greensboro, NC (US)

( * ) Notice: Subject to any disclaimer, the term of this patent is extended or adjusted under 35 U.S.C. 154(b) by 0 days.

(21) Appl. No.: 12/903,754

(22) Filed: Oct. 13, 2010

(65) Prior Publication Data
US 2011/0029219 A1 Feb. 3, 2011

Related U.S. Application Data

(62) Division of application No. 12/105,823, filed on Apr. 18, 2000, now Pat. No. 7,841,317.

(60) Provisional application No. 60/912,497, filed on Apr. 18, 2007, provisional application No. 60/948,873, filed on Jul. 10, 2007.

(51) Int. Cl.
F02M 43/00 (2006.01)
(52) U.S. Cl. ........................................ 123/304; 123/575
(58) Field of Classification Search .................. 123/304, 123/575–578
See application file for complete search history.

(56) References Cited

U.S. PATENT DOCUMENTS

| | | | |
|---|---|---|---|
| 2,911,958 A | 11/1959 | Griep | |
| 4,413,604 A | 11/1983 | Tune | |
| 5,237,978 A | 8/1993 | Bailey | |
| 5,245,953 A | 9/1993 | Shimada et al. | |
| 5,271,370 A | 12/1993 | Shimada et al. | |
| 5,336,396 A | 8/1994 | Shetley | |
| 5,450,832 A | 9/1995 | Graf | |
| 5,505,177 A | 4/1996 | Herdin et al. | |
| 5,911,210 A | 6/1999 | Flach | |
| 6,016,457 A | 1/2000 | Toukura et al. | |
| 6,035,837 A | 3/2000 | Cohen et al. | |
| 6,112,151 A | 8/2000 | Kruse | |
| 6,145,494 A | 11/2000 | Klopp | |
| 6,260,539 B1 | 7/2001 | Minowa et al. | |
| 6,370,472 B1 | 4/2002 | Fosseen | |

(Continued)

FOREIGN PATENT DOCUMENTS
DE 4131626 A1 3/1993
(Continued)

OTHER PUBLICATIONS
"Frybrid Diesel/Vegetable Oil," available at http://www.frybrid.com/frybrid.htm, Aug. 23, 2005, 2 pages.
(Continued)

*Primary Examiner* — Erick Solis
(74) *Attorney, Agent, or Firm* — Withrow & Terranova, PLLC

(57) ABSTRACT

A fuel control system for controlling the use of primary fuel and alternate fuel in an internal combustion engine without cross-contamination of fuel types. Cross-contamination of fuel types may eliminate the ability to receive certain benefits or financial incentives associated with use of alternate fuel, including but not limited to RINs, credits, and subsidies. In one embodiment, primary and/or alternate fuel are controllably delivered from sources to a flow cell. If blending is desired, both primary and alternate fuels are delivered to the flow cell. The engine is fed with the resulting primary fuel, alternate fuel, or blended mixture of fuel from the flow cell. The flow cell contains a bypass inlet port adapted to receive excess fuel not consumed by the engine in lieu of the excess fuel being returned to the primary and/or alternate fuel sources. In this manner, cross-contamination of the fuel sources can be avoided.

4 Claims, 14 Drawing Sheets

U.S. PATENT DOCUMENTS

| | | |
|---|---|---|
| 6,668,804 B2 | 12/2003 | Dobryden et al. |
| 6,687,597 B2 | 2/2004 | Sulatisky et al. |
| 6,698,387 B1 | 3/2004 | McFarland et al. |
| 6,839,619 B2 | 1/2005 | Bellinger |
| 7,044,103 B2 | 5/2006 | May |
| 7,107,942 B2 | 9/2006 | Weissman et al. |
| 7,640,913 B2 | 1/2010 | Blumberg et al. |
| 2005/0072384 A1 | 4/2005 | Hadley et al. |
| 2007/0119424 A1* | 5/2007 | Leone et al. .................. 123/461 |

FOREIGN PATENT DOCUMENTS

| | | |
|---|---|---|
| DE | 19823335 A1 | 12/1999 |
| DE | 19922748 A1 | 11/2000 |
| DE | 10217664 A1 | 11/2003 |
| EP | 1790839 A2 | 5/2007 |
| JP | 2003065094 | 3/2003 |
| JP | 2004190935 | 7/2004 |
| WO | 2006005930 A2 | 1/2006 |

OTHER PUBLICATIONS

"Greasecar Vegetable Fuel Systems," available at http://greasecar.com/product_detail.cfm, Aug. 23, 2005, 2 pages.

* cited by examiner

ALTERNATE FUEL BLENDING SYSTEM AND ASSOCIATED METHOD

RELATED APPLICATIONS

The present application is a divisional patent application of U.S. patent application Ser. No. 12/105,823 filed on Apr. 18, 2008 entitled "ALTERNATE FUEL BLENDING SYSTEM AND ASSOCIATED METHOD," which claims priority to U.S. Provisional Patent Application No. 60/912,497 filed on Apr. 18, 2007 entitled "ALTERNATE FUEL BLENDING SYSTEM AND ASSOCIATED METHOD," and U.S. Provisional Patent Application No. 60/948,873 filed on Jul. 10, 2007 entitled "ALTERNATE FUEL BLENDING SYSTEM AND ASSOCIATED METHOD," the contents of which are all incorporated herein by reference in their entireties.

FIELD OF THE INVENTION

The present invention relates to fuel systems for internal combustion engines used in both fixed and vehicle applications, and more particularly to fuel systems that provide both primary fuel and alternate fuel to an internal combustion engine.

BACKGROUND OF THE INVENTION

For a variety of reasons, most of which relate to environmental and alternative energy pursuits, certain primary fuel engines, such as diesel engines, can be made to accommodate alternate fuels, such as straight vegetable oil (SVO), "biodiesel," and other fuel oils (hereinafter "alternate fuels"). However, practical applications have demonstrated that some alternate fuels cannot be used in their pure or neat form under all engine and environmental conditions and must be blended with the primary fuel.

Recently, one method for the creation of motor fuels with alternate fuel content has been accomplished by blending primary and alternate fuels at or before the end user distribution point at low ratio to ameliorate alternate fuel negative attributes such as higher viscosity and the tendency to congeal at low temperatures, a common example being twenty percent alternate fuel to eighty percent primary fuel by volume. While this has benefit in allowing most engines designed to run on diesel to utilize a degree of alternate fuel, this methodology constrains the end user to a fixed ratio designed for worst-case utilization conditions, and in doing so effectively forfeits optimal utilization of the alternate fuel as actual end use conditions would otherwise permit.

Another limitation occurs if the alternate fuel is of renewable or other classifiable form (hereinafter "renewable") whereby governmental entities may choose to institute tax credits or assign renewable identification numbering (hereinafter "RIN") tracking and trading to both encourage renewable energy utilization and penalize those that abstain. In such a case, constraining the use of renewable fuels to a fixed blending ratio at time of motor fuel creation as constrained by ameliorating negative renewable fuel attributes creates penalties at multiple levels. For the environment, the reduction of potential renewable energy usage by fixed blending prevents maximal reduction of greenhouse gases by requiring an unnecessarily high component of fossil fuel. For the end user, the reduction of potential renewable energy usage by fixed blending reduces the tax credit available per gallon of motor fuel consumed. For the renewable fuel producer, the reduction of potential renewable energy usage by fixed blending caps potential end use within motor fuel and artificially constrains demand. Furthermore, RIN separation that would otherwise been possible at higher blend ratios will be forfeited, forcing RIN generation elsewhere, or raising the cost of RINs due to diminished supply.

Recently, another method for the creation of motor fuels with alternate fuel content has been accomplished by the selection of primary fuel and alternate fuel stored in separate fuel storage vessels, whereby selection is a manual or automated process. While this has benefit in allowing a higher utilization of alternate fuel when conditions permit its utilization, RIN extraction when renewable alternate fuel is utilized may be forfeited, as governmental entities may specify that RIN extraction to occur at time of blending with a fossil primary fuel. In another case however, RIN extraction may have already occurred with governmental entities thus mandating that the alternate fuel be utilized as a motor fuel in its neat form only. Additionally, state, county and municipal governmental entities may further provide local alternate fuel subsidies, credits or various mode restrictions based upon geographical boundary. With present art, differentiating these conflicting modes of operation to maintain legal compliance is problematic.

Yet another limitation may arise when primary fuel and alternate fuel are stored in separate fuel storage vessels, as typically the engine fuel pumping system and other engine components such as fuel injectors create bypassed fuel during their normal operation, said bypassed fuel being excess fuel not consumed by immediate engine combustion demand that must be returned to the fuel storage vessel also serving as the scavenge point and necessarily existing at a lower pressure than the output of the fuel pumping system or components producing said bypass. In this embodiment, some primary or secondary fuel will be entrained within the bypass system immediately following a change in fuel selection, thus cross-contaminating the primary and secondary fuel storage vessels. Likewise, RIN extraction when renewable alternate fuel is utilized may be forfeited, as governmental entities may choose to specify or interpret RIN extraction to occur at the time that the blending of the pure or neat renewable fuel with the fossil fuel occurs as the motor fuel is created, and any bypassing of primary fuel to the renewable fuel storage vessel would render it contaminated and no longer pure or neat, and therefore unsuitable for such purpose.

Therefore, an improved system and method of supplying an internal combustion engine with a primary fuel, an alternate fuel, or a combination of both is desired as to facilitate the maximum utilization of alternate fuels while simultaneously maintaining compliance with present and/or future governmental regulations and/or restrictions on use, and credit for renewable fuel utilization including the generation and tracking of renewable energy RIN-style trading methodologies as allowed.

SUMMARY OF THE INVENTION

As a first aspect, the present invention provides a fuel control system for controlling the use of a primary fuel and an alternate fuel in an internal combustion engine without cross-contamination of fuel types occurring from bypassed fuel. The present invention is further capable of the tabulation and reporting of primary fuel and alternate fuel consumed by both volume and ratio, wherein the measurement occurs at the primary and alternate fuel reservoirs.

In one embodiment, the present invention comprises a first fuel source structured to provide a primary fuel to a pump, a device for measurement of fuel volume and/or rate of consumption within the first fuel source, a pump, a valve or other mechanism controlling the flow of said pump, a second fuel source structured to provide a alternate fuel to a pump, a device for measurement of fuel volume and/or rate of consumption within the second fuel source, a pump, a valve or other mechanism controlling the flow of said pump, and a flow cell receiving both primary and alternate fuels.

The flow cell provides a limited reservoir of fuel for engine consumption, and further serves as both sourcing point of the selected or blended fuel to the engine fuel system and also for the acceptance and receipt of engine fuel system bypass, if and as required.

The embodiment also comprises the indication of the volume of fuel contained within the flow cell and/or rate of consumption of fuel contained within the flow cell.

The embodiment also comprises an electronic controller that by internal algorithm or as requested by external communications effects primary fuel and alternate fuel selection or blending by the control of primary fuel and secondary fuel control valves.

The electronic controller further inputs the volume contained within the flow cell and/or rate of consumption to maintain a sufficient reservoir of the selected or blended fuel for engine consumption.

The electronic controller may further input by communications the alternate fuel RIN number, or equivalent or similar identification and/or tracking methodology, if so assigned to the alternate fuel, and/or vendor or source.

The electronic controller may further input by communications the primary fuel and/or alternate fuel type or chemistry, or mixture of types or chemistries including composite mixtures of alternate fuel types and/or mixtures of alternate and primary fuels.

The electronic controller may further input by communications primary fuel and alternate fuel cost.

The electronic controller may further input by communications and/or store financial incentives, such as governmental credits, subsidies and/or restrictions of use, applicable for jurisdictions of operation.

The electronic controller may further input by communications user preferences, including but not limited to desired modes of operations, restrictions of modes of operation, including but not limited to optimized utilization of alternate fuel, optimized economy, optimized use of credits and/or subsidies, optimized engine horsepower, or combinations or tradeoffs thereof.

The electronic controller may further input by communications Global Positioning Satellite (hereinafter GPS) data or other geographical location or jurisdiction indicative data by continuous or intermittent stream.

The electronic controller further ascertains the volume of primary fuel and secondary fuel transferred from the fuel sources for a variety of control, metric, financial and regulatory purposes, including but not limited to a feedback mechanism for effecting the desired blend ratio, the tabulation of primary fuel and alternate fuel metered, the ratio of blend at which it occurred, or enforcement of neat operation if prescribed by RIN number or equivalent, other regulatory use restrictions, or user preference.

The electronic controller may further communicate the tabulation of primary and alternate fuel metered, the ratio of blend at which it occurred, or verification of neat mode compliance.

The embodiment may also include check valves or other methods to prevent reverse flow from the flow cell back into the primary fuel source and the alternate fuel source and thereby maintain the purity and differentiation of individual fuel types.

The flow cell may also include a drain port, manually or automatically controlled.

The flow cell may also include a water contamination sensor.

The flow cell may also include passive and/or active mixing devices.

The flow cell may also include one or more heating devices.

The flow cell may also include passive and active methods of temperature control, including but not limited to thermal insulation, thermostatic or temperature transducers, and control devices and methods as used to regulate said heating devices.

As a second aspect, the present invention provides a fuel control system for controlling the use of a primary fuel and an alternate fuel in an internal combustion engine without cross-contamination of fuel types occurring from bypassed fuel. The present invention is further capable of the tabulation and reporting of primary fuel and alternate fuel consumed by both volume and ratio, wherein the measurement occurs at a flow cell.

In this embodiment, the present invention comprises a first fuel source structured to provide a primary fuel to a pump, a pump, a valve or other mechanism controlling the flow of said pump, a second fuel source structured to provide a alternate fuel to a pump, a pump, a valve or other mechanism controlling the flow of said pump, and a flow cell receiving both primary and alternate fuels.

The flow cell provides a limited reservoir of fuel for engine consumption, and further serves as both sourcing point of the selected or blended fuel to the engine fuel system and also for the acceptance and receipt of engine fuel system bypass, if and as required.

The embodiment also comprises the indication of the volume of fuel contained within the flow cell, and/or rate of consumption of fuel contained within the flow cell.

The embodiment also comprises an electronic controller that by internal algorithm or as requested by external communications effects primary fuel and alternate fuel selection or blending by the control of primary fuel and secondary fuel control valves. The electronic controller may further input the volume contained within the flow cell or rate of consumption to maintain a sufficient reservoir of the selected or blended fuel for engine consumption as demanded by the engine.

The electronic controller may further input by communications the alternate fuel RIN number, or equivalent or similar identification and/or tracking methodology, if so assigned to the alternate fuel, and/or vendor or source.

The electronic controller may further input by communications the primary fuel and/or alternate fuel type or chemistry, or mixture of types or chemistries including composite mixtures of alternate fuel types and/or mixtures of alternate and primary fuels.

The electronic controller may further input by communications primary fuel and alternate fuel cost.

The electronic controller may further input by communications and/or store governmental credits, subsidies and/or restrictions of use applicable for jurisdictions of operation.

The electronic controller may further input by communications user preferences, including but not limited to desired modes of operations, restrictions of modes of operation, including but not limited to optimized utilization of alternate fuel, optimized economy, optimized use of credits and/or subsidies, optimized engine horsepower, or combinations or tradeoffs thereof.

The electronic controller may further input by communications Global Positioning Satellite (hereinafter GPS) data or other geographical location or jurisdiction indicative data by continuous or intermittent stream.

The electronic controller further ascertains the volume of primary fuel and secondary fuel transferred to the flow cell for a variety of control, metric, financial and regulatory purposes, including but not limited to a feedback mechanism for effecting the desired blend ratio, the tabulation of primary fuel and alternate fuel metered, the ratio of blend at which it occurred, or enforcement of neat operation if prescribed by RIN number or equivalent, other regulatory use restrictions, or user preference.

The electronic controller may further communicate the tabulation of primary and alternate fuel metered, the ratio of blend at which it occurred, or verification of neat mode compliance.

The embodiment may also include check valves or other methods to prevent reverse flow from the flow cell back into the primary fuel source and the alternate fuel source and thereby maintain the purity and differentiation of individual fuel types.

The flow cell may also include a drain port, manually or automatically controlled.

The flow cell may also include a water contamination sensor.

The flow cell may also include passive and/or active mixing devices.

The flow cell may also include one or more heating devices.

The flow cell may also include passive and active methods of temperature control, including but not limited to thermal insulation, thermostatic or temperature transducers, and control devices and methods as used to regulate said heating devices.

As a third aspect, the present invention provides a fuel control system for controlling the use of a primary fuel and an alternate fuel in an internal combustion engine without cross-contamination of fuel types. The present invention is further capable of the tabulation and reporting of primary fuel and alternate fuel consumed by both volume and ratio, wherein the measurement occurs within metering devices.

In this embodiment, the present invention comprises a first fuel source structured to provide a primary fuel to a pump, a pump, a valve or other mechanism controlling the flow of said pump, a metering device to measure primary fuel quantity, a second fuel source structured to provide a alternate fuel to a pump, a pump, a valve or other mechanism controlling the flow of said pump, a metering device to measure alternate fuel quantity, and a flow cell receiving both primary and alternate fuels.

The flow cell provides a limited reservoir of fuel for engine consumption, and further serves as both sourcing point of the selected or blended fuel to the engine fuel system and also for the acceptance and receipt of engine fuel system bypass, if and as required.

The embodiment also comprises the indication of the volume of fuel contained within the flow cell, and/or rate of consumption of fuel contained within the flow cell.

The embodiment also comprises an electronic controller that by internal algorithm or as requested by external communications effects primary fuel and alternate fuel selection or blending by the control of primary fuel and secondary fuel control valves. The electronic controller may further input the volume contained within the flow cell or rate of consumption to maintain a sufficient reservoir of the selected or blended fuel for engine consumption as demanded by the engine.

The electronic controller may further input by communications the alternate fuel RIN number, or equivalent or similar identification and/or tracking methodology, if so assigned to the alternate fuel, and/or vendor or source.

The electronic controller may further input by communications the primary fuel and/or alternate fuel type or chemistry, or mixture of types or chemistries including composite mixtures of alternate fuel types and/or mixtures of alternate and primary fuels.

The electronic controller may further input by communications primary fuel and alternate fuel cost.

The electronic controller may further input by communications and/or store governmental credits, subsidies and/or restrictions of use applicable for jurisdictions of operation.

The electronic controller may further input by communications user preferences, including but not limited to desired modes of operations, restrictions of modes of operation, including but not limited to optimized utilization of alternate fuel, optimized economy, optimized use of credits and/or subsidies, optimized engine horsepower, or combinations or tradeoffs thereof.

The electronic controller may further input by communications Global Positioning Satellite (hereinafter GPS) data or other geographical location or jurisdiction indicative data by continuous or intermittent stream.

The electronic controller further ascertains the volume of primary fuel and secondary fuel transferred to the flow cell by separate metering for a variety of control, metric, financial and regulatory purposes, including but not limited to a feedback mechanism for effecting the desired blend ratio, the tabulation of primary fuel and alternate fuel metered, the ratio of blend at which it occurred, or enforcement of neat operation if prescribed by RIN number or equivalent, other regulatory use restrictions, or user preference.

The electronic controller may further communicate the tabulation of primary and alternate fuel metered, the ratio of blend at which it occurred, or verification of neat mode compliance.

The embodiment may also include check valves or other methods to prevent reverse flow from the flow cell back into the primary fuel source and the alternate fuel source and thereby maintain the purity and differentiation of individual fuel types.

The flow cell may also include a drain port, manually or automatically controlled.

The flow cell may also include a water contamination sensor.

The flow cell may also include passive and/or active mixing devices.

The flow cell may also include one or more heating devices.

The flow cell may also include passive and active methods of temperature control, including but not limited to thermal insulation, thermostatic or temperature transducers, and control devices and methods as used to regulate said heating devices.

As a fourth aspect, the present invention provides a fuel control system for controlling the use of a primary fuel and an alternate fuel in an internal combustion engine capable of operating on primary and alternate fuels without cross-contamination of fuel types. The present invention is further capable of the tabulation and reporting of primary fuel and alternate fuel consumed by both volume and ratio, wherein the volume measurement may occur at the primary and alternate fuel reservoirs, and/or by separate metering devices, and wherein the ratio measurement may occur at the primary and alternate fuel reservoirs, by metering devices, and/or at the engine.

In this embodiment, the present invention comprises a first fuel source structured to provide a primary fuel to a pump, a pump, a metering device to measure primary fuel quantity, a second fuel source structured to provide a alternate fuel to a pump, a pump, a metering device to measure alternate fuel quantity.

The embodiment may also comprise data received by an electronic controller from the engine to determine blend ratio.

The embodiment may also comprise data transmitted by an electronic controller to the engine to instruct primary fuel and alternate fuel selection and/or blend ratio. The electronic controller may do so by internal algorithm or as requested by external communications.

The electronic controller may further input by communications the alternate fuel RIN number, or equivalent or similar identification and/or tracking methodology, if so assigned to the alternate fuel, and/or vendor or source.

The electronic controller may further input by communications the primary fuel and/or alternate fuel type or chemistry, or mixture of types or chemistries including composite mixtures of alternate fuel types and/or mixtures of alternate and primary fuels.

The electronic controller may further input by communications primary fuel and alternate fuel cost.

The electronic controller may further input by communications and/or store governmental credits, subsidies and/or restrictions of use applicable for jurisdictions of operation.

The electronic controller may further input by communications user preferences, including but not limited to desired modes of operations, restrictions of modes of operation, including but not limited to optimized utilization of alternate fuel, optimized economy, optimized use of credits and/or subsidies, optimized engine horsepower, or combinations or tradeoffs thereof.

The electronic controller may further input by communications Global Positioning Satellite (hereinafter GPS) data or other geographical location or jurisdiction indicative data by continuous or intermittent stream.

The electronic controller further ascertains the volume of primary fuel and secondary fuel transferred to the flow cell for a variety of control, metric, financial and regulatory purposes, including but not limited to a feedback mechanism for effecting the desired blend ratio, the tabulation of primary fuel and alternate fuel metered, the ratio of blend at which it occurred, or enforcement of neat operation if prescribed by RIN number or equivalent, other regulatory use restrictions, or user preference.

The electronic controller may further communicate the tabulation of primary and alternate fuel metered, the ratio of blend at which it occurred, or verification of neat mode compliance.

As a fifth aspect, the present invention provides a fuel control system for controlling the use of a primary fuel and an alternate fuel in an internal combustion engine capable of operating on primary and alternate fuels. The present invention is further capable of the tabulation and reporting of primary fuel and alternate fuel consumed by both volume and ratio, wherein the volume measurement may occur at the primary and alternate fuel reservoirs, at flow cells, and/or by metering devices, and wherein the ratio measurement may occur at the primary and alternate fuel reservoirs, at flow cells, by metering devices, and/or at the engine.

In this embodiment, the present invention comprises a first fuel source structured to provide a primary fuel to a pump, a pump, a valve or other mechanism controlling the flow of said pump, a metering device to measure primary fuel quantity, a flow cell receiving primary fuel, a second fuel source structured to provide a alternate fuel to a pump, a pump, a valve or other mechanism controlling the flow of said pump, a metering device to measure alternate fuel quantity, and a flow cell receiving alternate fuel.

The flow cells provide separate limited reservoirs of primary fuel and alternate fuel for engine consumption, and further serve for the acceptance and receipt of respective primary and alternate engine fuel system bypass, if and as required.

The embodiment also comprises the indication of the volume of fuel contained within the flow cells, and/or rate of consumption of fuel contained within the flow cells.

The embodiment also comprises an electronic controller. The electronic controller may further input the volume contained within the flow cells or rate of consumption to maintain a sufficient reservoir of primary and alternate fuels for engine consumption as demanded by the engine.

The embodiment may also comprise data received by an electronic controller from the engine to determine blend ratio.

The embodiment may also comprise data transmitted by an electronic controller to the engine to instruct primary fuel and alternate fuel selection and/or blend ratio. The electronic controller may do so by internal algorithm or as requested by external communications.

The electronic controller may further input by communications the alternate fuel RIN number, or equivalent or similar identification and/or tracking methodology, if so assigned to the alternate fuel, and/or vendor or source.

The electronic controller may further input by communications the primary fuel and/or alternate fuel type or chemistry, or mixture of types or chemistries including composite mixtures of alternate fuel types and/or mixtures of alternate and primary fuels.

The electronic controller may further input by communications primary fuel and alternate fuel cost.

The electronic controller may further input by communications and/or store governmental credits, subsidies and/or restrictions of use applicable for jurisdictions of operation.

The electronic controller may further input by communications user preferences, including but not limited to desired modes of operations, restrictions of modes of operation, including but not limited to optimized utilization of alternate fuel, optimized economy, optimized use of credits and/or subsidies, optimized engine horsepower, or combinations or tradeoffs thereof.

The electronic controller may further input by communications Global Positioning Satellite (hereinafter GPS) data or other geographical location or jurisdiction indicative data by continuous or intermittent stream.

The electronic controller further ascertains the volume of primary fuel and secondary fuel transferred to the flow cells by separate metering for a variety of control, metric, financial and regulatory purposes, including but not limited to a feedback mechanism for effecting the desired blend ratio, the tabulation of primary fuel and alternate fuel metered, the ratio of blend at which it occurred, or enforcement of neat operation if prescribed by RIN number or equivalent, other regulatory use restrictions, or user preference.

The electronic controller may further communicate the tabulation of primary and alternate fuel metered, the ratio of blend at which it occurred, or verification of neat mode compliance.

The flow cell may also include a drain port, manually or automatically controlled.

The flow cell may also include a water contamination sensor.

The flow cell may also include passive and/or active mixing devices.

The flow cell may also include one or more heating devices.

The flow cell may also include passive and active methods of temperature control, including but not limited to thermal insulation, thermostatic or temperature transducers, and control devices and methods as used to regulate said heating devices.

DETAILED DESCRIPTION OF EMBODIMENTS OF THE INVENTION

Figure 1:
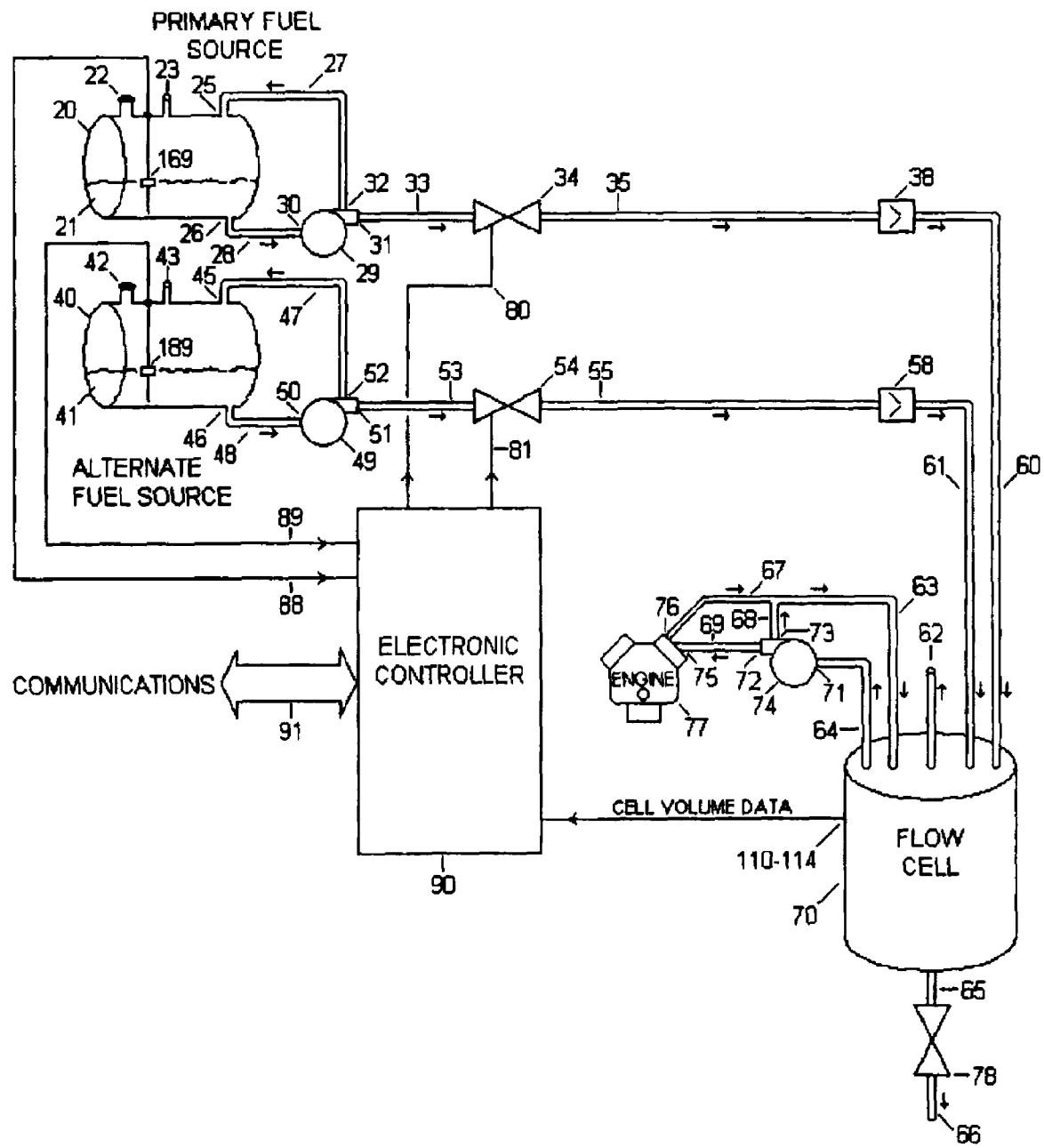
FIG. 1 is a schematic diagram of a blending system according to an embodiment of the present invention, the system shown ascertaining the volume of primary and alternate fuel consumed via metrics obtained from the primary and alternate fuel reservoirs.

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the expression "and/or" includes any and all combinations of one or more of the associated listed items.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity.

The present invention provides a fuel control system that can generally be used as an inexpensive and easily adaptable solution for selectively delivering a primary fuel and an alternate fuel for operation of an engine, doing so without cross-contamination of fuel reservoirs. The system additionally offers the capability of the tabulation of primary fuel and alternate fuel volumes metered, the ratio of blend at which it occurred, and the retrieval of said volumes and blend ratios. For the purposes of this application, the term "selectively deliver," and other forms thereof, is defined as providing an engine with 100% primary fuel and 0% alternate fuel, 100% alternate fuel and 0% primary fuel, or any mixture of primary fuel and alternate fuel. As will be discussed in more detail below, the selection or mixing of fuels may be accomplished in a variety of ways and may be automated and continuously adaptable based on a variety of data, including but not limited to data representative of fixed or mobile power generation, a vehicle, an engine, the environment, and/or alternate and primary fuel cost. For purposes of description within the accompanying drawings, unless specifically addressed, fuel storage vessels, fuel lines and components containing or conveying alternate fuel are often heated to reduce or control alternate fuel viscosity, such heating is not shown for simplicity.

Referring now to the drawings and, in particular, to FIG. 1, there is shown a fuel control system 1 for use in providing fuel to an internal combustion engine in accordance with one embodiment of the present invention. The fuel used by the engine may be a primary fuel 21 contained in a first fuel source 20, an alternate fuel 41 contained in a second fuel source 40, or, as will be described in more detail below, any combination of the primary fuel 21 and the alternate fuel 41.

Primary fuel source 20 includes an outlet port 26.

Similarly, alternate fuel source 40 includes an outlet port 46.

Primary fuel source 20 may also include features common to fuel storage reservoirs, including but not limited to fill adapter 22, fuel bypass return port 25, and vent port 23 to permit the creation of ullage as primary fuel is consumed.

Similarly, alternate fuel source 40 may also include features common to fuel storage reservoirs, including but not limited to fill adapter 42, fuel bypass return port 45, and vent port 43 to permit the creation of ullage as alternate fuel is consumed.

Vent ports 23 and 43 may be vented to atmosphere. Alternately, vent ports 23 and 43 may be routed to an activated carbon canister, routed proximate to engine air intake for scavenge, and/or maintained at engine vacuum; these and other methods common to those skilled in the art being intended to mitigate vapor release into the atmosphere.

The fuel control system 1 depicted in FIG. 1 also includes electronic controller 90 that by internal algorithm and/or external command effects control of some elements of system 1, receives signals from other elements of system 1, and is further capable recording data into memory for later transmission or retrieval. Electronic controller 90 also includes communications interface 91 capable of communications and external interface. Electronics controller 90 may be self-contained, distributed, or function as a sub-element of a larger electronic controller. More specifics of electronic controller 90 will be enumerated with these teachings as it interacts with various elements of system 1.

The fuel control system 1 depicted in FIG. 1 also includes a primary fuel pump 29 whose inlet 30 is sourced from the primary fuel source supply outlet 26 via fuel transmission line 28. Primary fuel pump 29 may be of such type that during normal operation generates fuel bypass at its bypass outlet port 32, which, if and as required by pump type and bypass demand, is returned to the primary fuel source 20 at bypass return port 25 via fuel return line 27. Outlet 31 of primary fuel pump 29 is connected to valve 34 via fuel transmission line 33, with the state of valve 34 being controlled by electronic controller 90, and therefore, effecting the status of primary fuel flow occurring as being transmitted into fuel transmission line 35.

Similarly, the fuel control system 1 depicted in FIG. 1 also includes an alternate fuel pump 49 whose inlet 50 is sourced from the primary fuel source supply outlet 46 via fuel transmission line 48. Alternate fuel pump 49 may likewise be of such type that during normal operation generates fuel bypass at its bypass outlet port 52, which, if and as required by pump type and bypass demand, is returned to the alternate fuel source 40 at bypass return port 45 via fuel return line 47. Outlet 51 of alternate fuel pump 49 is connected to valve 54 via fuel transmission line 53, with the state of valve 54 likewise controlled by electronic controller 90, and therefore, effecting the status of alternate fuel flow occurring as being transmitted into fuel transmission line 55.

Fuel transmission lines 35 and 55 may also contain check valves 38 and 58 respectively, desirable to prevent reverse flow due to gravity, siphoning or other causes; thus said check valves serving to prevent contamination of neat fuel types.

As will be discussed in more detail later within these teachings, the fuel control system 1 depicted in FIG. 1 also includes flow cell 70. Flow cell 70 by construct containing a volume, the volume therein sourced by primary fuel inlet line 60 and alternate fuel inlet line 61, whereupon any fuel sourced by inlet lines 60 and 61 being allowed to intermix within said volume.

Flow cell 70 also includes fuel outlet line 63 serving as fuel source for the engine, specifically the engine fuel control system, and in this embodiment doing so by sourcing engine fuel pump 74 inlet 71.

Engine fuel pump 74 may also produce bypass, in fact pump 74 may be of multi-stage construction and thus produce bypass at a plurality of points, represented by bypass output port 73 as connected to fuel return line 68. Furthermore, the engine itself may produce bypass at one or more points, including but not limited to fuel injectors, control valves, and pressure relief ports, said bypass sources represented by bypass port 76 as connected to bypass fuel return line 67. While multiple bypass return lines may be employed, in this embodiment bypass fuel return lines 67 and 68 are joined to form fuel return line 63.

To allow for the acceptance of prior mixed fuel as had occurred within the volume of flow cell 70 that was not combusted within engine 77 and instead returned as bypass, flow cell 70 also includes bypass fuel return line 63, thus flow cell 70 is rendered capable of re-accepting prior mixed fuel into said flow cell volume.

Importantly, this flow cell methodology eliminates the need to return bypassed fuel to one or both of primary fuel source 20 and/or alternate fuel source 40, thus preventing cross-contamination and therefore the preservation of neat fuel status and classification, as may be required for RIN extraction if blending, or compliance with of neat only usage restrictions if prescribed by RIN number or equivalent, other regulatory use restrictions, or user preference.

Importantly, this flow cell methodology and the elimination of returned bypassed fuel to one or both of primary fuel source 20 and/or alternate fuel source 40 allows for the separate and accurate metering of primary fuel 21 and secondary fuel 41, and the accurate determination of blend ratio at time of metering, as may be required for RIN extraction.

In effect, flow cell 70 serves as a surrogate fuel source for an engine designed to accept a single fuel supply source, providing both a source of fuel and the capability to accept bypass; however the volume within flow cell 70 is capable of selectively delivering either a primary fuel 21, an alternate fuel 41, or blend thereof.

Flow cell 70 also includes vent port 62 to allow for the free creation and removal of ullage within the volume of flow cell 70, and to maintain the volume within flow cell 70 at a lower pressure than fuel source and bypass sources to promote flow. Vent port 62 may be vented to atmosphere. Alternately, vent port 62 may be routed to an activated carbon canister, routed proximate to engine air intake for scavenge, and/or maintained at engine vacuum; these and other methods common to those skilled in the art being intended to mitigate vapor release into the atmosphere.

It should be noted that since the ullage within flow cell 70 is nominally maintained at atmospheric pressure or slight vacuum, and furthermore ideally at the same pressure as the ullage within primary fuel storage 20 and alternate fuel storage 40 via a common vent manifold, pumps 29 and 49, valves 45, 48, 54 and 58, and other common components likewise effectively work against slight vacuum, zero or minimal pressure differential, thus simplifying their design requirements, extending their useful life, and reducing system cost.

Flow cell 70 also includes at least one sensor indicating liquid volume contained therein and/or volume rate of change, represented by signal lines 110 through 114, which transmit this data to electronic controller 90 such that electronic controller 90 may by controlling valves 34 and 54 maintain a sufficient volume of fuel within flow cell 70 for both instantaneous and sustained engine demand.

Referring back to primary fuel source 20 within fuel control system 1 depicted in FIG. 1, primary fuel source 20 also includes a fuel volume measurement device 169 whose function is to measure the volume of primary fuel 21 as communicated to electronic controller 90 via signal line 88. Primary fuel volume measurement device 169 may any device suitable for direct or inferential volume measurement, including but not limited to float, Archimedes principal, mass of fuel, or tare mass of fuel and storage vessel combined. Primary fuel volume measurement device 169 may be continuous in its measurement, or quantized. Primary fuel volume measurement device 169 may also provide linear and/or digital output via signal line 88.

Similarly, Referring back to alternate fuel source 40 within fuel control system 1 depicted in FIG. 1, alternate fuel source 40 also includes a fuel volume measurement device 189 whose function is to measure the volume of alternate fuel 41 as communicated to electronic controller 90 via signal line 89. Alternate fuel volume measurement device 189 may any device suitable for direct or inferential volume measurement, including but not limited to float, Archimedes principal, mass of fuel, or tare mass of fuel and storage vessel combined. Alternate fuel volume measurement device 189 may be continuous in its measurement, or quantized. Alternate fuel volume measurement device 189 may also provide linear and/or digital output via signal line 89.

Within the embodiment of fuel control system 1 depicted in FIG. 1, electronic controller 90 utilizes volume data derived from primary fuel measurement device 169 and alternate fuel measurement device 189 to both perform blending of primary fuel 21 and alternate fuel 41 according to a desired ratio, and also extraction of one or more financial incentives in the form of RINs and/or determination of other financial incentives, such as tax credits and/or subsidies, as allowed and as applicable. Blend ratios enforced by the electronic controller 90 may be based on what is the most cost effective (i.e. lowest cost) fuel to be consumed by the engine. For example, it may be more cost effective to use alternate fuel based on not only the cost of the alternate fuel, but any financial incentives that may be available for use of alternate fuel. Primary fuel may still be blended with the alternate fuel if required to receive such financial incentives. Alternatively, primary fuel may be more cost effective to run the engine even in light of the financial incentives. Certain jurisdictions may still require use of some alternate fuel along with primary fuel even if the primary fuel is most cost effective. In summary, the electronic controller 90 can perform these calculations and enforce the desired blend ratio according to these parameters.

Also, if RINs are available for use of the alternate fuel, the electronic controller 90 may receive RIN information regarding the alternate fuel delivered to the alternate fuel storage 40 in the form of one or more RINs if the RINs have not been previously extracted. Such communication may be wired or wireless, and may come from an external system. A separate RIN may be available for each increment of alternate fuel delivered, such as for every gallon for example. The electronic controller 90 may control delivery of the primary and/or alternate fuel based on the RIN information. For example, if the RINs have already been extracted, the electronic controller 90 may operate in "neat" mode such that no blending of the primary fuel and alternate fuel is performed. Only primary or alternate fuel would be delivered to the flow cell 70. If RINs have not been extracted, RIN-based incentives may be available for blending alternate fuel with primary fuel for use by the engine. The RINs would be extracted by the electronic controller 90 as blending occurs.

As an example, if the usable volume within flow cell 70 is designed to be 100 milliliters and a blend ratio of 30 percent primary fuel and 70 percent alternate fuel is desired, electronic controller 90 would establish flow of primary fuel by enabling valve 34 until measurement device 169 indicated 30 milliliters had been dispensed into flow cell 70, at which time valve 34 would be disabled. Similarly, electronic controller 90 would establish flow of alternate fuel by enabling valve 54 until measurement device 189 indicated 70 milliliters had been dispensed into flow cell 70, at which time valve 54 would be disabled. As fuel is consumed by engine 77 and the volume of blended fuel within flow cell 70 becomes depleted, at a specified threshold of depletion the above process would repeat, with the depleted volume being replaced again according to ratio. As one example, if 50 milliliters is required to replenish the fuel volume within flow cell 70, electronic controller 90 would establish flow of primary fuel by enabling valve 34 until measurement device 169 indicated 15 milliliters had been dispensed into flow cell 70, at which time valve 34 would be disabled. Similarly, electronic controller 90 would establish flow of alternate fuel by enabling valve 54 until measurement device 189 indicated 35 milliliters had been dispensed into flow cell 70, at which time valve 54 would be disabled. And so on. Furthermore, during each blend operation, the volume of primary fuel 21 and alternate fuel 41 and the ratio at which the blend occurred may be recorded by electronic controller 90 for later transmission or retrieval, or by predetermined time, elapsed time interval, or accumulation of data may be immediately transmitted by communications methods to an external system or communications network, wired or wireless, by electronic controller 90, said volume and blend data useful for extraction of RINs and/or determination of tax credits and/or subsidies, as allowed and as applicable.

With separate volume measurement devices available, specifically measurement device 169 determining volume of primary fuel 21 and measurement device 189 determining volume of alternate fuel 41, there is nothing to prohibit electronic controller 90 dispensing primary fuel 21 and alternate fuel 41 into the flow cell 70 simultaneously, or in any sequence of partial or full dispense operations.

Likewise, while electronic controller effected the blending of primary fuel 21 with alternate fuel 41 in the prior examples, there is nothing to prohibit electronic controller 90 from maintaining a reservoir volume of either primary fuel 21 or alternate fuel 41 within flow cell 70 in neat form. In this case, electronic controller 90 would be selecting operation between primary fuel 21 or alternate fuel 41, and therefore not performing a blending function. Similarly, during neat fuel selection operation, the volume of primary fuel 21 and alternate fuel 41 may be recorded by electronic controller 90 for later transmission or retrieval, or by predetermined time, elapsed time interval, or accumulation of data may be immediately transmitted by communications methods to an external system or communications network, wired or wireless, by electronic controller 90, said volume and blend data, said blend being 0:100% or 100:0% in this case, useful for extraction of RINs and/or determination of tax credits and/or subsidies, as allowed and as applicable, and also for verification that neat utilization had in fact occurred, if and as prescribed.

Figure 2:
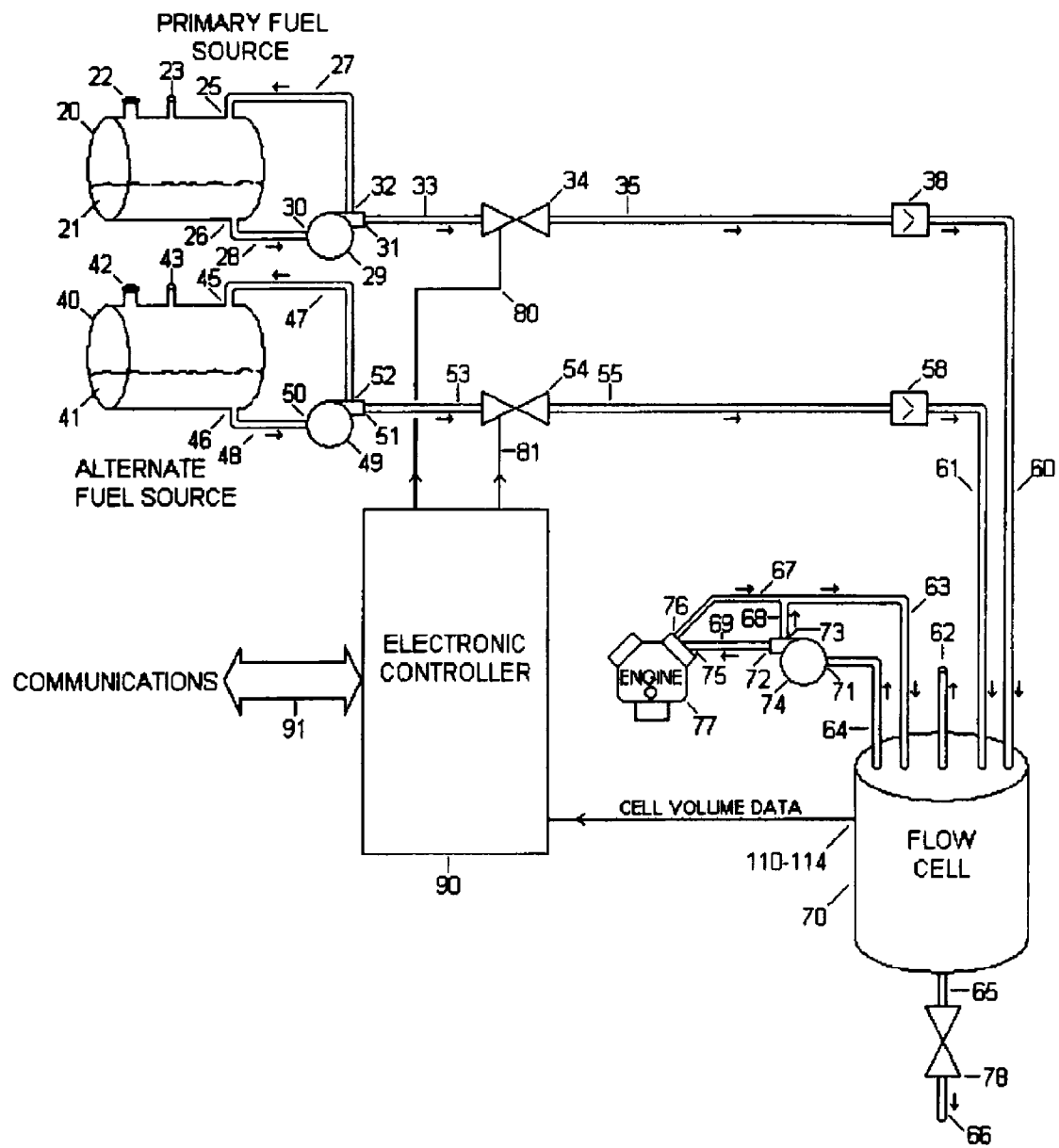
FIG. 2 is a schematic diagram of a blending system according to an embodiment of the present invention, the system shown ascertaining the volume of primary and alternate fuel consumed via metrics obtained at the flow cell.

Referring now to the drawings and, in particular, to FIG. 2, there is shown a fuel control system 2 for use in providing fuel to an internal combustion engine in accordance with one embodiment of the present invention. The fuel used by the engine may be a primary fuel 21 contained in a first fuel source 20, an alternate fuel 41 contained in a second fuel source 40, or, as will be described in more detail below, any combination of the primary fuel 21 and the alternate fuel 41.

Unless otherwise specifically stated, fuel control system 2 depicted in FIG. 2 inherits identical elements and corresponding functional descriptions as fuel control system 1 depicted in FIG. 1, with like numbers referring to like elements throughout.

The control system 2 depicted in FIG. 2 differs from fuel control system 1 depicted in FIG. 1 in that primary fuel 21 volume measurement device 169 and alternate fuel 41 volume measurement device 189 as elements of fuel control system 1 depicted in FIG. 1 have been deleted in control system 2 depicted in FIG. 2. Furthermore, volume measurement data as was provided by primary fuel 21 volume measurement device 169 and alternate fuel 41 volume measurement device 189 fuel control system 1 depicted in FIG. 1 have been replaced by volume measurement within flow cell 70 in control system 2 depicted in FIG. 2. This substitution becomes possible as the rate of fuel being consumed by engine 77, and therefore being withdrawn as volume from flow cell 70, is much less that the rate by which primary fuel 21 and alternate fuel 41 may be dispensed into flow cell 70, thereby minimizing error. Furthermore, under steady state operating conditions, the amount of withdrawal by engine 77 may be calculated, and therefore may optionally be compensated.

Within the embodiment of fuel control system 2 depicted in FIG. 2, electronic controller 90 utilizes volume data derived from flow cell 70 volume measurement device as communicated by signal lines 110-114 to both perform blending of primary fuel 21 and alternate fuel 41 according to a desired ratio, and also extraction of RINs and/or determination of tax credits and/or subsidies, as allowed and as applicable. As an example, if the usable volume within flow cell 70 is designed to be 100 milliliters and a blend ratio of 30 percent primary fuel and 70 percent alternate fuel is desired, electronic controller 90 would establish flow of primary fuel by enabling valve 34 until flow cell 70 volume signal lines 110-114 indicated 30 milliliters had been dispensed into flow cell 70, at which time valve 34 would be disabled. Similarly, electronic controller 90 would establish flow of alternate fuel by enabling valve 54 until flow cell 70 volume signal lines 110-114 indicated 70 milliliters had been dispensed into flow cell 70, at which time valve 54 would be disabled. As fuel is consumed by engine 77 and the volume of blended fuel within flow cell 70 becomes depleted, at a specified threshold of depletion the above process would repeat, with the requite volume being replaced according to ratio. As one example, if 50 milliliters is required to replenish the fuel volume within flow cell 70, electronic controller 90 would establish flow of primary fuel by enabling valve 34 until flow cell 70 cell volume signal lines 110-114 indicated 15 milliliters had been dispensed into flow cell 70, at which time valve 34 would be disabled. Similarly, electronic controller 90 would establish flow of alternate fuel by enabling valve 54 until flow cell 70 cell volume signal lines 110-114 indicated 35 milliliters had been dispensed into flow cell 70, at which time valve 54 would be disabled. And so on. Furthermore, during each blend operation, the volume of primary fuel 21 and alternate fuel 41 and the ratio at which the blend occurred may be recorded by electronic controller 90 for later transmission or retrieval, or by predetermined time, elapsed time interval, or accumulation of data may be immediately transmitted by communications methods to an external system or communications network, wired or wireless, by electronic controller 90, said volume and blend data useful for extraction of RINs and/or determination of tax credits and/or subsidies, as allowed and as applicable.

With a single volume measurement point serving for both primary fuel 21 and alternate fuel 41 present within this embodiment, specifically measurement derived from flow cell 70 cell volume signal lines 110-114, primary fuel 21 and alternate fuel 41 must be dispensed into flow cell 70 as separate operations, however there is nothing to prohibit electronic controller 90 dispensing primary fuel 21 and alternate fuel 41 into the flow cell 70 in any sequence of partial or full dispense operations.

Likewise, while electronic controller 90 effected the blending of primary fuel 21 with alternate fuel 41 in the prior examples, there is nothing to prohibit electronic controller 90 from maintaining a reservoir volume of either primary fuel 21 or alternate fuel 41 within flow cell 70 in neat form. In this case, electronic controller 90 would be selecting operation between primary fuel 21 or alternate fuel 41, and therefore not performing a blending function. Similarly, during neat fuel selection operation, the volume of primary fuel 21 and alternate fuel 41 may be recorded by electronic controller 90 for later transmission or retrieval, or may be immediately transmitted by communications methods to an external system by electronic controller 90, said volume data useful for extraction of RINs and/or determination of tax credits and/or subsidies, as allowed and as applicable, and also for verification that neat utilization had in fact occurred, if and as prescribed.

At this point in these teachings, both fuel control system 1 depicted in FIG. 1 and fuel control system 2 depicted in FIG. 2 have utilized volume measurement methods derived from storage vessel and/or intermediate storage vessel volume sensing, specifically primary fuel 21 volume measurement device 169 and alternate fuel 41 volume measurement device 189 and/or measurement derived from flow cell 70 cell volume signal lines 110-114. While being desirable embodiments in that primary fuel 21 volume measurement device 169 and alternate fuel 41 volume measurement device 189 would nominally preexist to provide on-hand fuel volume indication to the system user, further useful to provide the capability for electronic controller 90 to automatically select the remaining fuel type should one fuel type become depleted, and that mathematical and statistical methods exist to those familiar with the art to obtain precise measurements, and/or likewise that flow cell 70 cell volume signal lines 110-114 preexist to allow electronic controller 90 the ability to maintain a sufficient reservoir of fuel within flow cell 70 and that mathematical and statistical methods similarly exist to those familiar with the art to obtain precise measurement, nevertheless such embodiments constrain themselves best to stationary operation. If employed on a vehicle, inertial forces imposed on the liquid fuels complicate accurate measurement for use in controlling blend ratio and the extraction of RINs and/or determination of tax credits and/or subsidies, especially where specific and verifiable calibration standards may be imposed, whereby the system may further require seal by various governmental weights and measures entities, may require tamper resistance, and/or may require tamper evidence. Therefore, a more preferred set of embodiments are also taught.

Figure 3:
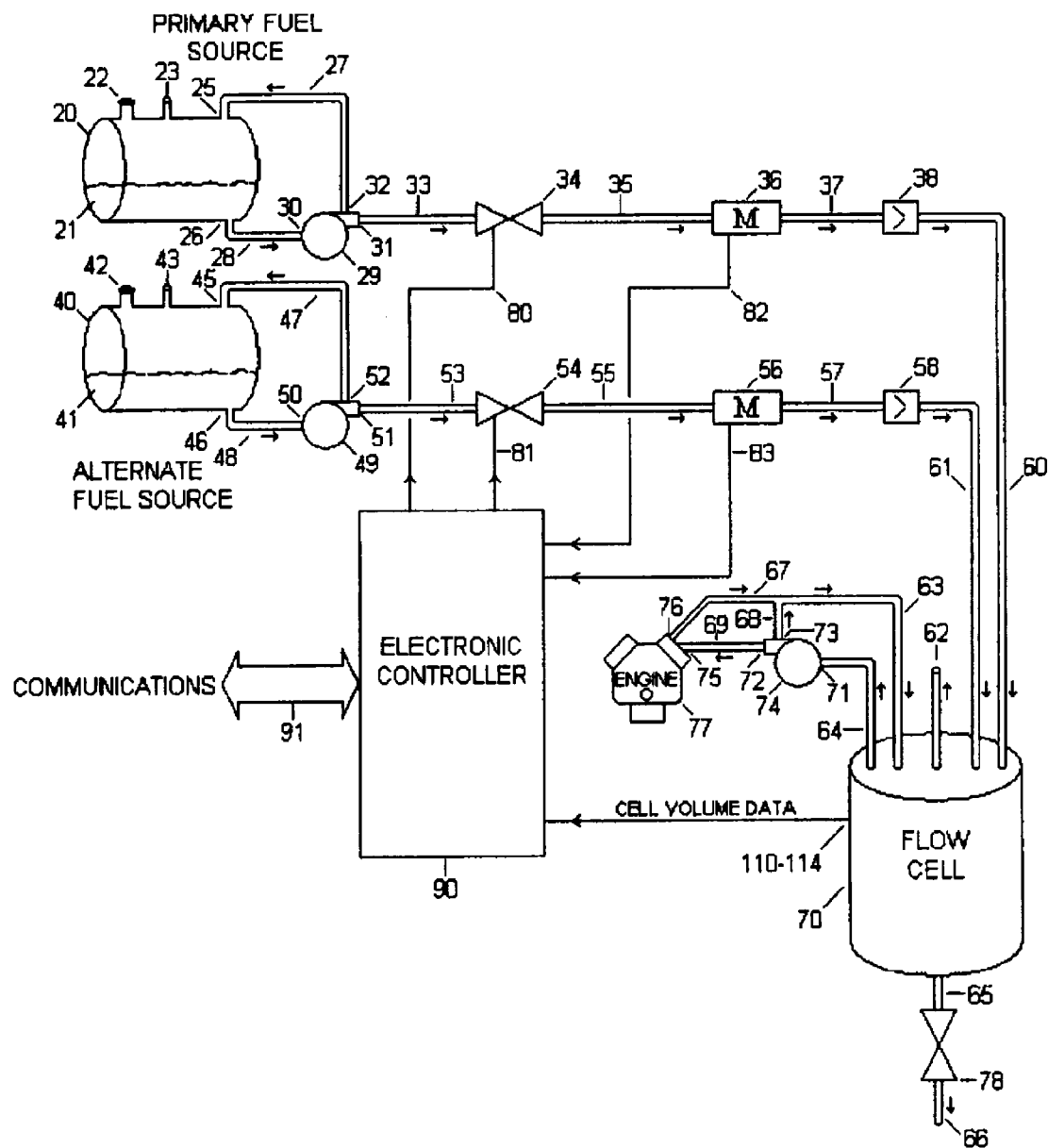
FIG. 3 is a schematic diagram of a blending system according to an embodiment of the present invention, the system shown ascertaining the volume of primary and alternate fuel consumed via metrics obtained by metering devices.

Referring now to the drawings and, in particular, to FIG. 3, there is shown a fuel control system 3 for use in providing fuel to an internal combustion engine in accordance with one embodiment of the present invention. The fuel used by the engine may be a primary fuel 21 contained in a first fuel source 20, an alternate fuel 41 contained in a second fuel source 40, or, as will be described in more detail below, any combination of the primary fuel 21 and the alternate fuel 41.

Unless otherwise specifically stated, fuel control system 3 depicted in FIG. 3 inherits identical elements and corresponding functional descriptions as fuel control system 1 depicted in FIG. 1, with like numbers referring to like elements throughout.

The control system 3 depicted in FIG. 3 differs from fuel control system 1 depicted in FIG. 1 in that primary fuel 21 volume measurement device 169 and alternate fuel 41 volume measurement device 189 as elements of fuel control system 1 depicted in FIG. 1 have been deleted in control system 3 depicted in FIG. 3. Furthermore, the function of volume measurements as originally provided by primary fuel 21 volume measurement device 169 and alternate fuel 41 volume measurement device 189 in fuel control system 1 depicted in FIG. 1 have been respectively replaced by primary fuel volume measurement device 36 and alternate fuel measurement device 56 in control system 3 depicted in FIG. 3.

Volume measurement devices 36 and 56 may be of a broad construct of possible metering devices including but not limited to positive displacement in nature such as piston, screw, roots or gear, and/or metering devices inferential in nature such as turbine, pressure differential, thermal, or stagnation against an element. Furthermore, while volume measurement is being sought, there is nothing to prevent the utilization of metering devices that instead measure flow rate by nature, said flow rate being converted into volume by the inclusion of time by electronic controller 90, or by the metering device itself.

Volume measurement devices 36 and 56 may be made capable to accept calibration to defined or prescribed standards, or be of such fixed or stable nature by construct such that their characteristics may be classified against defined or prescribed standards. Furthermore, electronic controller 90 may be made programmable to accept said calibration and/or characterization data pertaining to devices 36 and 56, and therefore able to include said calibration and/or characteristic data within internal calculations to establish a known and verifiable accuracy in compliance with defined or prescribed standards.

Volume measurement devices 36 and 56 may be of such construct as to be sealed once calibrated and/or characterized. Volume measurement devices 36 and 56 may further be of such construct as to resist tampering, display evidence of tampering, cease function and/or signal occurrence if tampered.

Electronic controller 90 may be of such construct as to be sealed once programmed with calibration and/or characterization data. Electronic controller 90 may further be of such construct as to resist tampering, display evidence of tampering, cease function and/or signal occurrence if tampered.

Referring back to primary fuel source 20 within fuel control system 3 depicted in FIG. 3, primary fuel source 20 also includes within downstream path pump 29 to promote flow, valve 34 to control flow, and a fuel volume measurement device 36 whose function is to measure the volume of primary fuel 21 transferred from primary fuel source 40 to flow cell 70 and communicate this volume to electronic controller 90 via signal line 82.

Similarly, Referring back to alternate fuel source 40 within fuel control system 3 depicted in FIG. 3, primary fuel source 40 also includes within downstream path pump 49 to promote flow, valve 54 to control flow, and a fuel volume measurement device 56 whose function is to measure the volume of alternate fuel 41 transferred from alternate fuel source 40 to flow cell 70 and communicate this volume to electronic controller 90 via signal line 83.

Within the embodiment of fuel control system 1 depicted in FIG. 1, electronic controller 90 utilizes volume data derived from primary fuel measurement device 36 via signal line 82 and alternate fuel measurement device 56 via signal line 83 to perform blending of primary fuel 21 and alternate fuel 22 according to a desired ratio, and also extraction of RINs and/or determination of tax credits and/or subsidies, as allowed and as applicable. As an example, if the usable volume within flow cell 70 is designed to be 100 milliliters and a blend ratio of 30 percent primary fuel and 70 percent alternate fuel is desired, electronic controller 90 would establish flow of primary fuel by enabling valve 34 via control line 80 until measurement device 36 indicated 30 milliliters had been dispensed into flow cell 70, at which time valve 34 would be disabled via control line 80. Similarly, electronic controller 90 would establish flow of alternate fuel by enabling valve 54 via control line 81 until measurement device 56 indicated 70 milliliters had been dispensed into flow cell 70, at which time valve 54 would be disabled via control line 81. As fuel is consumed by engine 77 and the volume of blended fuel within flow cell 70 becomes depleted, at a specified threshold of depletion the above process would repeat, with the requisite volume being replaced according to ratio. As one example, if 50 milliliters is required to replenish the fuel volume within flow cell 70, electronic controller 90 would establish flow of primary fuel by enabling valve 34 via control line 80 until measurement device 36 indicated 15 milliliters had been dispensed into flow cell 70, at which time valve 34 would be disabled via control line 80. Similarly, electronic controller 90 would establish flow of alternate fuel by enabling valve 54 via control line 81 until measurement device 189 indicated 35 milliliters had been dispensed into flow cell 70, at which time valve 54 would be disabled via control line 81. And so on. Furthermore, during each blend operation, the volume of primary fuel 21 and alternate fuel 41 and the ratio at which the blend occurred may be recorded by electronic controller 90 for later transmission or retrieval, or by predetermined time, elapsed time interval, or accumulation of data may be immediately transmitted by communications methods to an external system or communications network, wired or wireless, by electronic controller 90, said volume and blend data useful for extraction of RINs and/or determination of tax credits and/or subsidies, as allowed and as applicable.

With separate volume measurement devices available, specifically measurement device 36 determining volume of primary fuel 21 and measurement device 56 determining volume of alternate fuel 41, there is nothing to prohibit electronic controller 90 dispensing primary fuel 21 and alternate fuel 41 into the flow cell 70 simultaneously, or in any sequence of partial or full dispense operations.

Likewise, while electronic controller effected the blending of primary fuel 21 with alternate fuel 41 in the prior examples, there is nothing to prohibit electronic controller 90 from maintaining a reservoir volume of either primary fuel 21 or alternate fuel 41 within flow cell 70 in neat form. In this case, electronic controller 90 would be selecting operation between primary fuel 21 or alternate fuel 41, and therefore not performing a blending function. Similarly, during neat fuel selection operation, the volume of primary fuel 21 and alternate fuel 41 may be recorded by electronic controller 90 for later transmission or retrieval, or by predetermined time, elapsed time interval, or accumulation of data may be immediately transmitted by communications methods to an external system or communications network, wired or wireless, by electronic controller 90, said volume and blend data, said blend being 0:100% or 100:0% in this case, useful for extraction of RINs and/or determination of tax credits and/or subsidies, as allowed and as applicable, and also for verification that neat utilization had in fact occurred, if and as prescribed.

Within the embodiments prior described, certain elements may be easily combined and will be described for completeness. The combined element embodiments that follow should not be construed as limited to the embodiments set forth herein; rather, these embodiments are provided so that this disclosure will satisfy applicable legal requirements.

Figure 4:
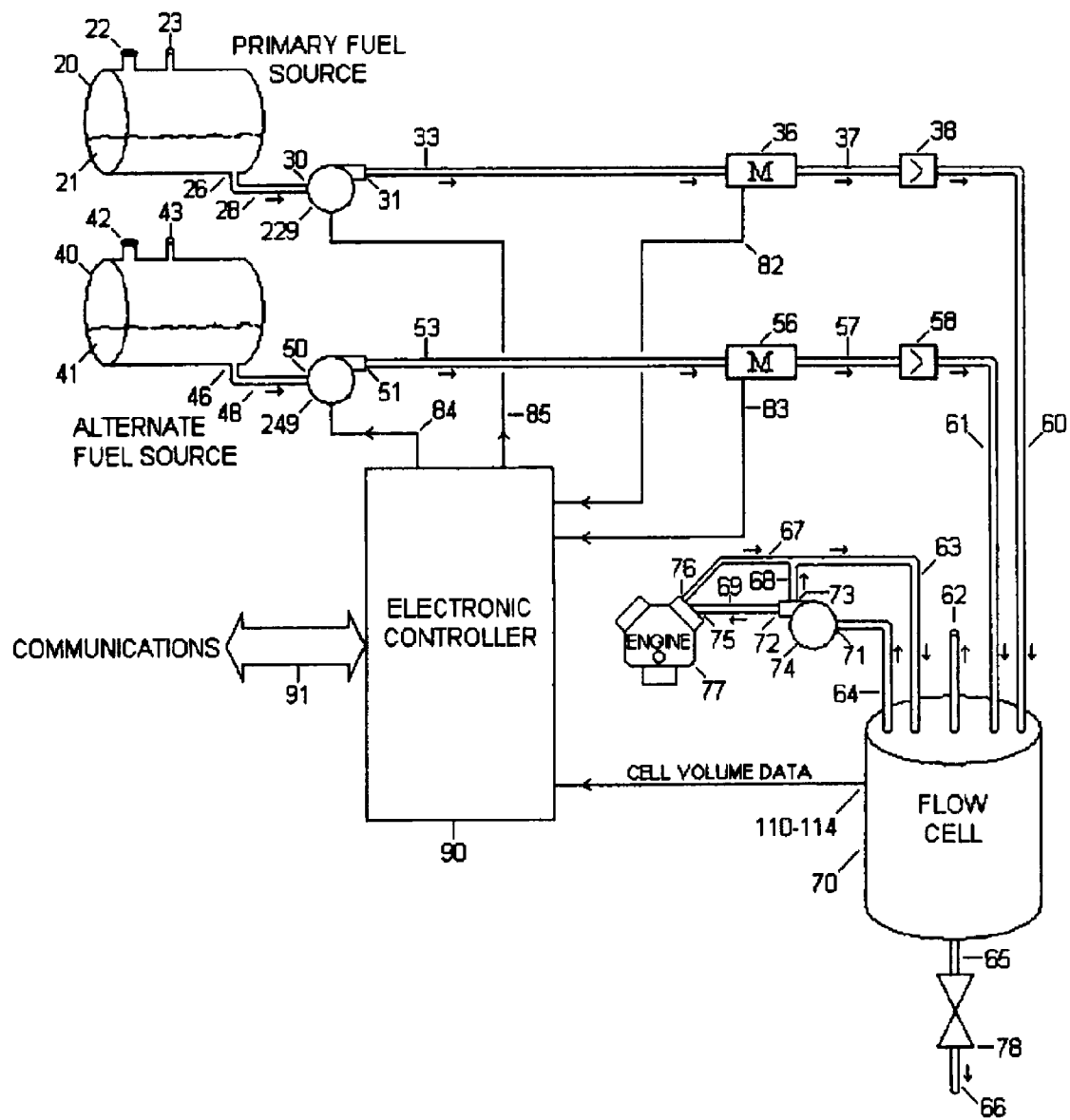
FIG. 4 is a schematic diagram of a blending system according to an embodiment of the present invention, the system depicting the possible elimination of the valve devices by utilization of a positive displacement pumps.

Referring now to the drawings and, in particular, to FIG. 4, there is shown a fuel control system 4 for use in providing fuel to an internal combustion engine in accordance with one embodiment of the present invention. The fuel used by the engine may be a primary fuel 21 contained in a first fuel source 20, an alternate fuel 41 contained in a second fuel source 40, or, as will be described in more detail below, any combination of the primary fuel 21 and the alternate fuel 41.

Unless otherwise specifically stated, fuel control system 4 depicted in FIG. 4 inherits identical elements and corresponding functional descriptions as fuel control system 3 depicted in FIG. 3, with like numbers referring to like elements throughout.

The control system 4 depicted in FIG. 4 differs from fuel control system 3 depicted in FIG. 3 in that primary fuel pump 29, primary fuel valve 34, alternate fuel pump 49 and alternate fuel valve 54 elements of fuel control system 3 depicted in FIG. 3 have been deleted in control system 4 depicted in FIG. 4 and replaced in function by primary fuel pump 229 and alternate fuel pump 249 in system 4 depicted in FIG. 4, each pump now serving both pump and flow control functions.

Primary fuel pump 229 and alternate fuel pump 249 in system 4 depicted in FIG. 4 are of a positive displacement construct, and are further prohibited from being free-running, and instead are controlled by electronic controller 90 via control lines 85 and 84, respectively. Whereas system 3 depicted in FIG. 3 exercised control of primary fuel valve 34 and alternate fuel valve 54 to permit or prohibit flow of the respective fuel types, system 4 depicted in FIG. 4 exercises control of primary pump 229 and alternate fuel pump 249 to induce or prohibit flow, and therefore achieve the same function.

Figure 5:
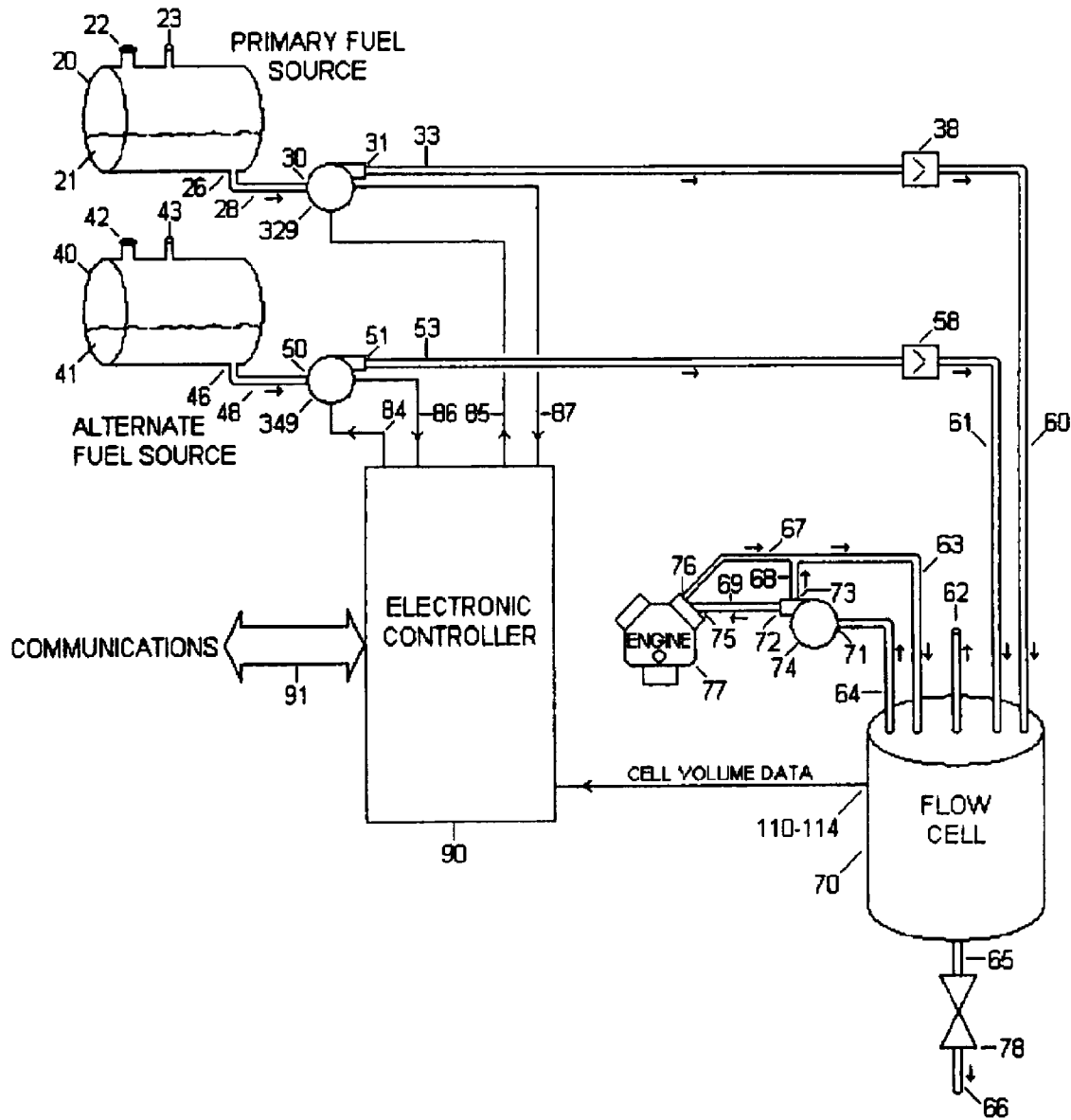
FIG. 5 is a schematic diagram of a blending system according to an embodiment of the present invention, the system depicting the possible elimination of the valve and metering devices by utilization of a positive displacement pump providing encoded control and/or feedback.

Referring now to the drawings and, in particular, to FIG. 5, there is shown a fuel control system 5 for use in providing fuel to an internal combustion engine in accordance with one embodiment of the present invention. The fuel used by the engine may be a primary fuel 21 contained in a first fuel source 20, an alternate fuel 41 contained in a second fuel source 40, or, as will be described in more detail below, any combination of the primary fuel 21 and the alternate fuel 41.

Unless otherwise specifically stated, fuel control system 5 depicted in FIG. 5 inherits identical elements and corresponding functional descriptions as fuel control system 4 depicted in FIG. 4, with like numbers referring to like elements throughout.

The control system 5 depicted in FIG. 5 differs from fuel control system 4 depicted in FIG. 4 in that primary fuel pump 229, primary fuel measurement device 36, alternate fuel pump 249 and alternate fuel measurement device 56 have been deleted in control system 5 depicted in FIG. 5 and respectively replaced in function by primary fuel pump 329 and alternate fuel pump 349 in system 5 depicted in FIG. 5, each pump now serving pumping, flow control and volume metering functions.

Primary fuel pump 329 and alternate fuel pump 349 in system 5 depicted in FIG. 5 are of a positive displacement construct, are prohibited from being free-running and controlled by electronic controller 90 via control lines 85 and 84, respectively. Primary fuel pump 329 and alternate fuel pump 349 further are of such construct that the volume transmitted is encoded and returned via signal lines 87 and 86 respectively to electronic controller 90. Primary fuel pumps 329 and alternate fuel pump 349 may further be of such construct as the motor or prime moving device is controllable in burst or discrete step by electronic controller 90 via control lines 85 and 84 respectively, with said burst or discrete step representing a known volume.

Returning now to a preferred embodiment, in particular, to control system 3 depicted in FIG. 3, where specific and verifiable calibration standards may be imposed or prescribed, where the system may require seal by various governmental weights and measures entities, may require tamper resistance, reveal tamper attempt, and/or response to tamper attempt, it becomes desirable to utilize discrete and separate volume measurement devices, and several such embodiments follow that expand upon control system 3 depicted in FIG. 3. The embodiments that follow should not be construed as limited to the embodiments set forth herein; rather, these embodiments are provided so that this disclosure will satisfy applicable legal requirements.

Figure 6:
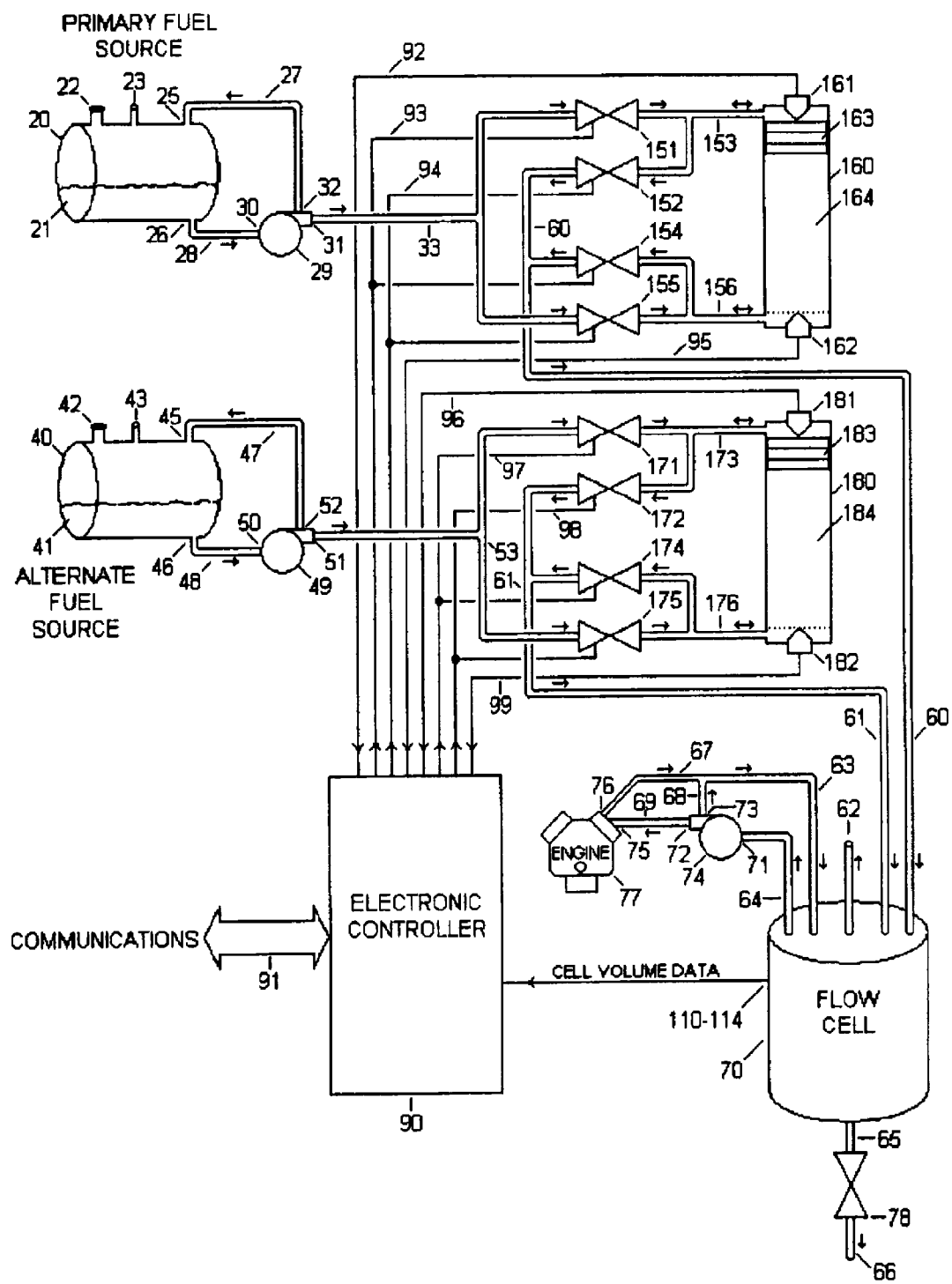
FIG. 6 is a schematic diagram of a blending system according to an embodiment of the present invention, the system shown ascertaining the volume of primary and alternate fuel consumed via metrics obtained by cylinders of known volume as controlled by discrete valves.

Referring now to the drawings and, in particular, to FIG. 6, there is shown a fuel control system 6 for use in providing fuel to an internal combustion engine in accordance with one embodiment of the present invention. The fuel used by the engine may be a primary fuel 21 contained in a first fuel source 20, an alternate fuel 41 contained in a second fuel source 40, or, as will be described in more detail below, any combination of the primary fuel 21 and the alternate fuel 41.

Unless otherwise specifically stated, fuel control system 6 depicted in FIG. 6 inherits identical elements and corresponding functional descriptions as fuel control system 3 depicted in FIG. 3, with like numbers referring to like elements throughout.

The control system 6 depicted in FIG. 6 differs from fuel control system 3 depicted in FIG. 3 in that primary fuel valve 34, primary volume measurement device 36 and primary fuel check valve 38 of fuel control system 3 depicted in FIG. 3 have been deleted in control system 6 depicted in FIG. 6 and replaced in function by primary fuel control valves 151, 152, 154 and 155, cylinder 160 piston 163 assembly, sensor 161 and sensor 162, said primary fuel control valves 151, 152, 154 and 155, cylinder 160 piston 163 assembly, sensor 161 and sensor 162 in system 6 depicted in FIG. 6 now serving flow control, volume measurement and check valve functions.

Similarly, control system 6 depicted in FIG. 6 differs from fuel control system 3 depicted in FIG. 3 in that alternate fuel valve 54, alternate volume measurement device 56 and alternate fuel check valve 58 of fuel control system 3 depicted in FIG. 3 have been deleted in control system 6 depicted in FIG. 6 and replaced in function by alternate fuel control valves 171, 172, 174 and 175, cylinder 180 piston 183 assembly, sensor 181 and sensor 182, said alternate fuel control valves 171, 172, 174 and 175, cylinder 180 piston 183 assembly, sensor 181 and sensor 182 in system 6 depicted in FIG. 6 now serving flow control, volume measurement and check valve functions.

Within the embodiment in control system 6 depicted in FIG. 6, measurement of primary fuel volume is effected by allowing piston 163 to cyclically transverse within a constrained length of cylinder 160, said length being defined as the distance traversed by piston 163 between contact with sensor 161 and sensor 162 occurring at each cycle extremity, said volume being the three dimensional volume traversed during said length less the volume occupied by piston 163, with electronic controller 90 counting said occurrences of contact with sensor 161 via signal line 92 and/or 163 via signal line 95 and multiplying the count of said sensor contact occurrences to obtain the total volume of primary fuel measured. Also, upon each occurrence of sensor contact, electronic controller 90 further effects control of valves 151, 152, 154 and 155 via valve control signal lines 93 and 94 in a manner to reverse the travel of piston 163 as appropriate and thus effect cycling. For example, with piston 163 starting in contact with sensor 161 and electronic controller 90 having determined the requirement that a volume of primary fuel 21 be dispensed into flow cell 70, electronic controller 90 enables valve control signal line 93 to open valves 151 and 154, and disables control signal line 94, if prior enabled, to close valves 152 and 155, thus allowing the piston to move from the direction of sensor 161 toward the direction of sensor 162, the piston being driven under force of primary fuel pressure present within connecting manifold fuel line 33, effecting flow through valve 151 and connecting manifold fuel line 153, said force thereby transmitted to piston 163 effecting motion of piston 163. The said motion of piston 163 expels the quantity of entrained fuel prior existing on the opposite side of piston 163 via manifold fuel line 156, valve 154, and to flow cell 70 via fuel line 60 while simultaneously entraining new primary fuel on its driven side as piston 163 travels from its initial contact with sensor 161 until such time sensor 162 becomes contacted. At such time of contact with sensor 162 as conveyed to electronic controller 90 via signal line 95, if electronic controller 90 requires additional quanta of primary fuel be dispensed into flow cell 70, valve control signal line 93 is disabled by electronic controller 90 to close valves 151 and 154, and valve control signal line 94 is enabled to open valves 152 and 155, thus allowing the piston to move from the direction of sensor 162 toward sensor 161, and the cycle is repeated. And so on. If, however, electronic controller 90 requires that no additional quanta of primary fuel be dispensed into flow cell 70, valve control signal lines 93 and 94 are disabled, closing valves 151, 152, 154 and 155, and thus halting further flow of primary fuel 21.

Similarly, within the embodiment in control system 6 depicted in FIG. 6, measurement of alternate fuel volume is effected by allowing piston 183 to cyclically transverse within a constrained length of cylinder 180, said length being defined as the distance traversed by piston 183 between contact with sensor 181 and sensor 182 occurring at each cycle extremity, said volume being the three dimensional volume traversed during said length less the volume occupied by piston 183, with electronic controller 90 counting said occurrences of contact with sensor 181 via signal line 96 and/or 182 via signal line 99 and multiplying the count of said sensor contact occurrences to obtain the total volume of primary fuel measured. Also, upon each occurrence of sensor contact, electronic controller 90 further effects control of valves 171, 172, 174 and 175 via valve control signal lines 97 and 98 in a manner to reverse the travel of piston 180 as appropriate and thus effect cycling. For example, with piston 183 starting in contact with sensor 181 and electronic controller 90 having determined the requirement that a volume of alternate fuel 41 be dispensed into flow cell 70, electronic controller 90 enables valve control signal line 97 to open valves 171 and 174, and disables control signal line 98, if prior enabled, to close valves 172 and 175, thus allowing the piston to move from the direction of sensor 181 toward the direction of sensor 182, the piston being driven under force of primary fuel pressure present within connecting manifold fuel line 53, effecting flow through valve 171 and connecting manifold fuel line 173, said force thereby transmitted to piston 183 effecting motion of piston 183. The said motion of piston 183 expels the quantity of entrained fuel prior existing on the opposite side of piston 183 via manifold fuel line 176, valve 174, and to flow cell 70 via fuel line 61 while simultaneously entraining new alternate fuel on its driven side as piston 183 travels from its initial contact with sensor 181 until such time sensor 182 becomes contacted. At such time of contact with sensor 182 as conveyed to electronic controller 90 via signal line 99, if electronic controller 90 requires additional quanta of alternate fuel be dispensed into flow cell 70, valve control signal line 99 is disabled by electronic controller 90 to close valves 171 and 174, and valve control signal line 98 is enabled to open valves 172 and 175, thus allowing the piston to move from the direction of sensor 182 toward sensor 181, and the cycle is repeated. And so on. If, however, electronic controller 90 requires that no additional quanta of alternate fuel be dispensed into flow cell 70, valve control signal lines 97 and 98 are disabled, closing valves 171, 172, 174 and 175, and thus halting further flow of alternate fuel 41.

Contact sensors 161, 162, 181 and/or 183 may be made physically and/or electrically adjustable to vary the effective length of cylinders 160 and/or 180 to effect adjustment and/or calibration of volume. Contact sensors 161, 162, 181 and/or 183, electronic controller 90, and/or their associated embodiments may also be made sealable by mechanical device or indicia to certify calibrated status and/or to reveal tampering.

Contact sensors 161, 162, 181 and/or 183 may be made physically and/or electrically fixed, with calibration effected by comparing cylinder volume displacement to a known standard volume or by measurement device, where the resulting measurement, measurement error and/or calibration factor associated with individual cylinder displacements is stored within electronic controller 90 in nonvolatile fashion. Contact sensors 161, 162, 181 and/or 183, electronic controller 90, and/or their associated embodiments may still be made sealable by mechanical device or indicia to certify calibrated status and/or to reveal tampering due to their ability to modify apparent cylinder volume if modified or changed.

Electronic controller 90 may further be made cryptographically secure, both in stored calibration data, if used and if any, but also in stored information such as primary and alternate fuel totals, blend ratios, including the ability to preset or clear these values.

While contact sensors 161, 162, 181 and 182 are shown within the embodiment in control system 6 depicted in FIG. 6, there is nothing to preclude the measurement and/or detection of piston 160 and 180 traversal within respective cylinders 160 and 180 by substitution of linear or digital measurement or encoding devices measuring said traversal.

While piston 160 and 180 traversal within respective cylinders 160 and 180 as shown within the embodiment in control system 6 depicted in FIG. 6 is effected by pressure provided by external pumps 29 and 49 respectively, there is nothing to preclude a prime mover being attached to pistons 160 and 180, and the piston-cylinder assembles further serving as a pumping devices, either in assist capacity, or in serving for the elimination of pumps 29 and 49. The prime mover may further be measured and/or encoded as to its motion such that sensors 161, 162, 181 and 182, or of linear or digital measurement or encoding devices replacing them are eliminated.

In the alternate embodiments above, sensors 161, 162, 181 and 182 may be retained as useful for full-travel detection, serving as limit switches to prevent piston 160 and 180 over-travel, said detection especially desired in systems employing prime movers of force sufficient to render damage if traverse motion is left unchecked.

Figure 7:
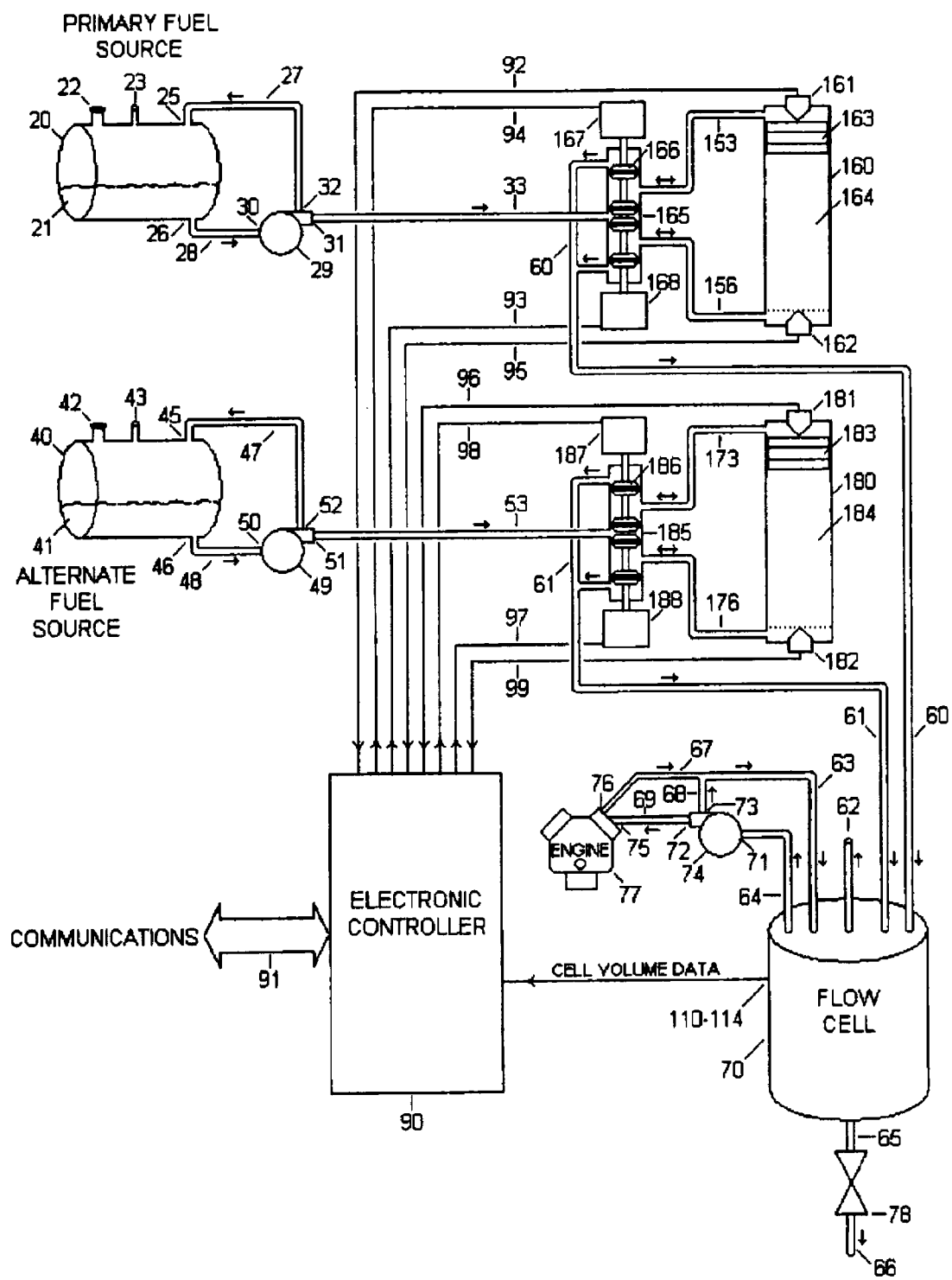
FIG. 7 is a schematic diagram of a blending system according to an embodiment of the present invention, the system shown ascertaining the volume of primary and alternate fuel consumed via metrics obtained by cylinders of known volume as controlled by compound valves.

Referring now to the drawings and, in particular, to FIG. 7, there is shown a fuel control system 7 for use in providing fuel to an internal combustion engine in accordance with one embodiment of the present invention. The fuel used by the engine may be a primary fuel 21 contained in a first fuel source 20, an alternate fuel 41 contained in a second fuel source 40, or, as will be described in more detail below, any combination of the primary fuel 21 and the alternate fuel 41.

Unless otherwise specifically stated, fuel control system 7 depicted in FIG. 7 inherits identical elements and corresponding functional descriptions as fuel control system 6 depicted in FIG. 6, with like numbers referring to like elements throughout.

The control system 7 depicted in FIG. 7 differs from fuel control system 6 depicted in FIG. 6 in that primary fuel valves 151, 152, 154 and 155, and alternate fuel valves 171, 172, 174 and 175 have been deleted in control system 7 depicted in FIG. 7 and respectively replaced in function by primary fuel five-way valve 165 driven by opposing solenoids 167 and 168, and alternate fuel five-way valve 185 driven by opposing solenoids 187 and 188, each five-way valve now replacing the function of four discrete valves, thus reducing cost and component count.

Five-way valves 165 and 185 are of such construct that when their corresponding solenoids are disabled, respective valve flow control elements 166 and 186 return to their center positions as depicted in FIG. 7, thus disabling any flow of fuel. Regarding further description of system behavior, valve control signal lines 93, 94, 97 and 98 as controlled by electronic controller 90 effect identical fuel flow control and measurement enablement function as described for system 6 depicted in FIG. 6.

Figure 8:
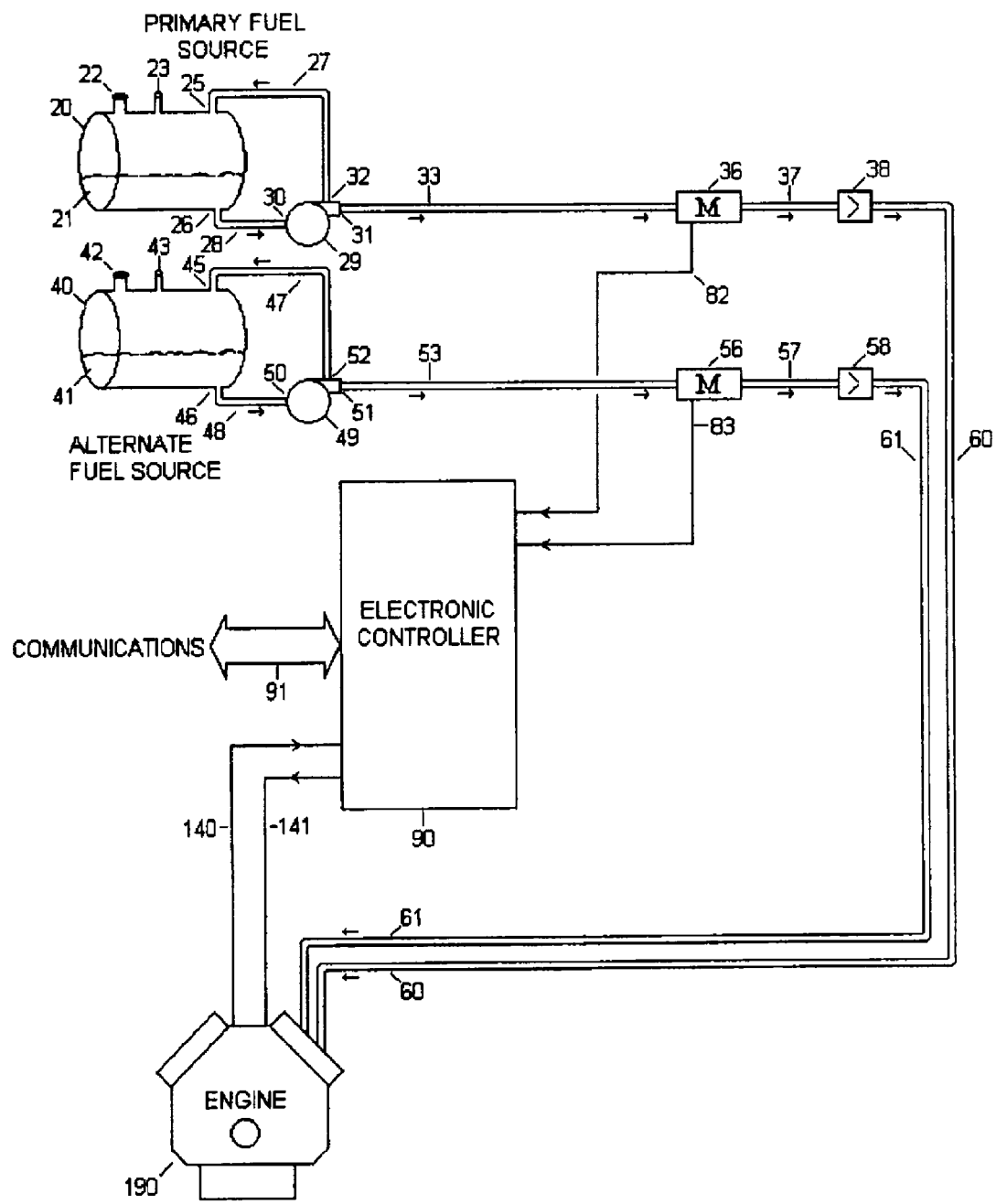
FIG. 8 is a schematic diagram of a blending system according to an embodiment of the present invention, the system shown for an internal combustion engine capable of operating on separate primary and alternate fuels without production of bypass at the engine and capable of ascertaining the volume of primary and alternate fuel consumed by at least one of metrics prior enumerated.

Referring now to the drawings and, in particular, to FIG. 8, there is shown a fuel control system 8 for use in providing fuel to an internal combustion engine in accordance with one embodiment of the present invention. The fuel used by the engine may be a primary fuel 21 contained in a first fuel source 20, an alternate fuel 41 contained in a second fuel source 40, or, as will be described in more detail below, any combination of the primary fuel 21 and the alternate fuel 41.

Unless otherwise specifically stated, fuel control system 8 depicted in FIG. 8 inherits identical elements and corresponding functional descriptions as fuel control system 3 depicted in FIG. 3, with like numbers referring to like elements throughout.

The control system 8 depicted in FIG. 8 differs from fuel control system 3 depicted in FIG. 3 in that engine 77 has been deleted and replaced with engine 190, said engine 190 capable of receiving both a primary fuel 21 and an alternate fuel 41, and performing blending of primary fuel 21 and alternate fuel 41 at the engine.

The control system 8 depicted in FIG. 8 further differs from fuel control system 3 depicted in FIG. 3 in that primary fuel control valve 34, alternate fuel control valve 54 and flow cell 70 have been deleted, with primary fuel 21 and alternate fuel 41 being made continuously and directly available to engine 190.

Within the embodiment of control system 8 depicted in FIG. 8, electronic controller 90 utilizes volume data derived from primary fuel measurement device 36 and alternate fuel measurement device 56 for extraction of RINs and/or determination of tax credits and/or subsidies, as allowed and as applicable.

Also within the embodiment of control system 8 depicted in FIG. 8, electronic controller 90 utilizes blend ratio data derived from engine 190 via signal line(s) 140. Alternately, or in conjunction, electronic controller 90 may specify the desired blend ratio to engine 190 via signal line(s) 141, or may provide direct injector timing and/or control of engine 190, thus effecting desired blend ratio. Said blend ratio is coupled with primary fuel 21 and alternate fuel 41 volume derived from primary fuel measurement device 36 and alternate fuel measurement device 56 for extraction of RINs and/or determination of tax credits and/or subsidies, as allowed and as applicable.

At this point in these teachings, fuel control system 8 depicted in FIG. 8 utilized engine 190 capable of operating from both primary fuel 21 and alternate fuel 41, and therefore flow cell 70 was omitted as an intermediary blending cell. While being a desirable embodiment due to simplicity, multiple limitations nevertheless exist. Specifically, no provision is allotted for primary fuel and/or alternate fuel bypass occurring at engine 190, as may be desired and generated at the fuel injector rails for pressure management, and/or desired and generated at the fuel injectors themselves to provide pressure differential or pressure relief. Secondly, primary fuel measurement device 36 and alternate fuel measurement device 56 operate at high pressure and also may experience significant pressure pulsation due to normal injector operation, which makes accurate measurement of volume difficult as internal metering elements may vibrate as pressure gradients are reflected and/or distributed throughout the system. Lastly, actual flow rates experienced by primary fuel measurement device 36 and alternate fuel measurement device 56 are small; being dictated by actual real-time engine fuel consumption, not batch dispense, and further diminished in that usage may be distributed over two fuel types, which places further engineering demands on the construct and cost of fuel measurement device 36 and alternate fuel measurement device 56. Therefore, a more preferred embodiment is taught.

Figure 9:
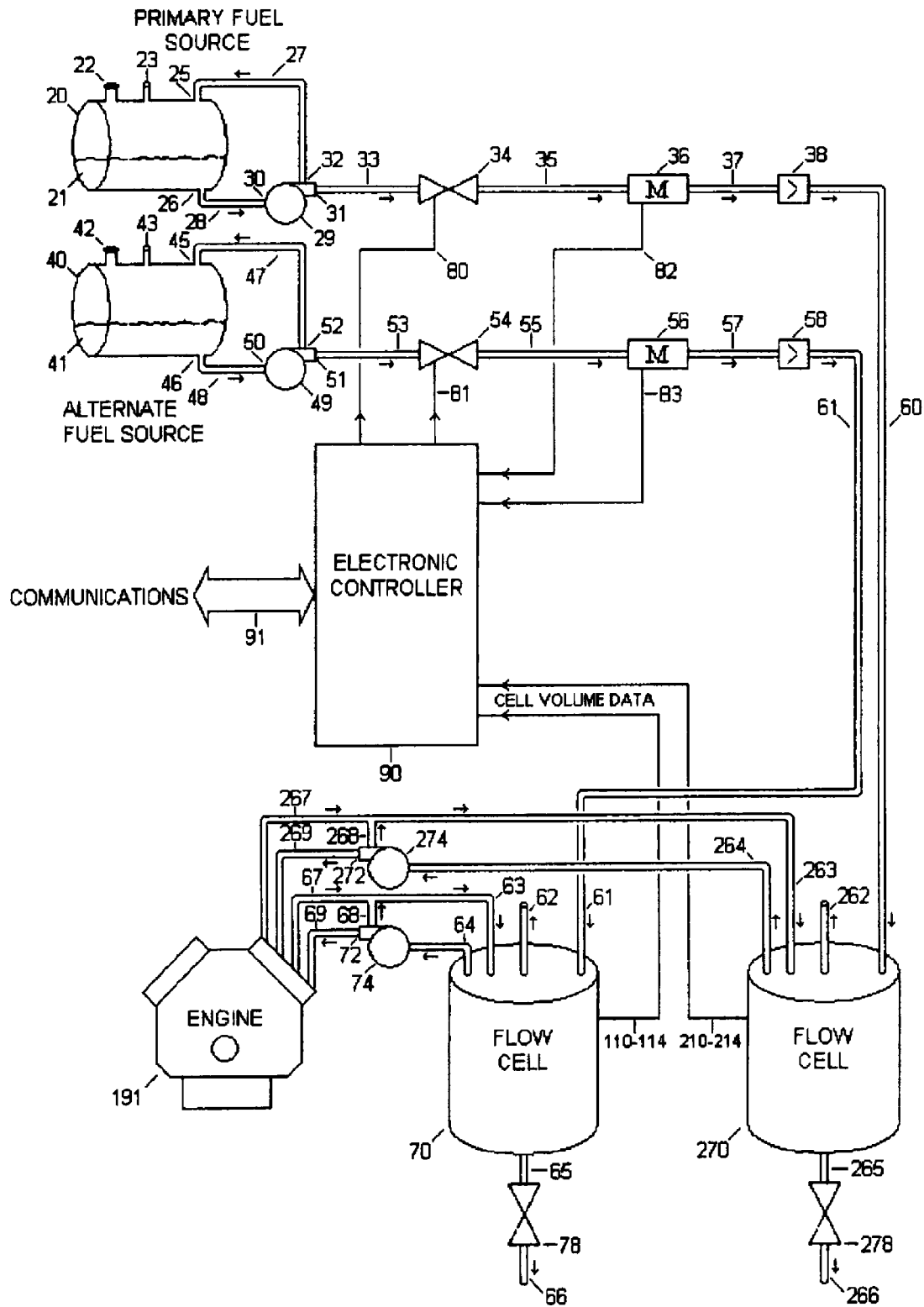
FIG. 9 is a schematic diagram of a blending system according to an embodiment of the present invention, the system shown for an internal combustion engine capable of operating on separate primary and alternate fuels with allotment for the production of bypass at the engine and capable of ascertaining the volume of primary and alternate fuel consumed by at least one of metrics prior enumerated.

Referring now to the drawings and, in particular, to FIG. 9, there is shown a fuel control system 9 for use in providing fuel to an internal combustion engine in accordance with one embodiment of the present invention. The fuel used by the engine may be a primary fuel 21 contained in a first fuel source 20, an alternate fuel 41 contained in a second fuel source 40, or, as will be described in more detail below, any combination of the primary fuel 21 and the alternate fuel 41.

Unless otherwise specifically stated, fuel control system 9 depicted in FIG. 9 inherits identical elements and corresponding functional descriptions as fuel control system 3 depicted in FIG. 3, with like numbers referring to like elements throughout.

The control system 9 depicted in FIG. 9 differs from fuel control system 3 depicted in FIG. 3 in that engine 77 has been deleted and replaced with engine 191, said engine 191 capable of receiving both a primary fuel 21 and an alternate fuel 41, and performing blending of primary fuel 21 and alternate fuel 41 at the engine.

The control system 9 depicted in FIG. 9 further differs from fuel control system 3 depicted in FIG. 3 in that separate flow cells exist, thus requiring the addition of flow cell 270. Specifically, flow cell 270 is now dedicated for primary fuel 21, whereas flow cell 70 is now dedicated to alternate fuel 41. Accordingly, the dual inlet nature of the flow cells has been modified, and now only a single inlet is provided, specifically fuel inlet line 60 for primary fuel 21 dispense into flow cell 270, and fuel inlet line 61 for alternate fuel 41 dispense into flow cell 70.

Likewise, a second set of flow cell volume signal lines 210-214 exist for flow cell 270 for electronic controller 90 to maintain a sufficient reservoir of primary fuel within flow cell 270, in similar fashion as flow cell volume signal lines 110-114 exist for flow cell 70 for electronic controller 90 to maintain a sufficient reservoir of alternate fuel within flow cell 70, as also described earlier in these teachings.

Primary fuel flow cell 270 also includes fuel outlet line 264 serving as primary fuel source for the engine, specifically the engine fuel control system, and in this embodiment doing so by sourcing engine fuel pump 274.

Engine primary fuel pump 274 may also produce bypass, in fact pump 274 may be of multi-stage construction and thus produce primary fuel bypass at a plurality of points, said bypass connected to bypass fuel return line 268. Furthermore, the engine itself may produce primary fuel bypass at one or more points, including but not limited to fuel injectors, control valves, and pressure relief ports, said bypass sources represented and returned via bypass fuel return line 267. While multiple primary fuel bypass return lines may be employed, in this embodiment bypass fuel return lines 267 and 268 are joined to form fuel return line 263.

To allow for the acceptance of primary fuel that was not combusted within engine 191 and instead returned as bypass, flow cell 270 also includes bypass fuel return line 263, thus flow cell 270 is rendered capable of re-accepting bypassed fuel into said flow cell volume.

Similarly, engine alternate fuel pump 74 may also produce bypass, in fact pump 74 may be of multi-stage construction and thus produce alternate fuel bypass at a plurality of points, said bypass connected to bypass fuel return line 68. Furthermore, the engine itself may produce alternate fuel bypass at one or more points, including but not limited to fuel injectors, control valves, and pressure relief ports, said bypass sources represented and returned via bypass fuel return line 67. While multiple alternate fuel bypass return lines may be employed, in this embodiment bypass fuel return lines 67 and 68 are joined to form fuel return line 63.

To allow for the acceptance of alternate fuel that was not combusted within engine 191 and instead returned as bypass, flow cell 70 also includes bypass fuel return line 63, thus flow cell 70 is rendered capable of re-accepting bypassed fuel into said flow cell volume.

Importantly, this flow cell methodology eliminates the need to return bypassed fuel to a single flow cell, thus preventing cross-contamination before actual blending at engine 191, and therefore the preservation of neat fuel status and classification, as may be required for RIN extraction if blending, or compliance with of neat only usage restrictions if prescribed by RIN number or equivalent, other regulatory use restrictions, or user preference.

Importantly, this flow cell methodology and the elimination of returned bypassed fuel to one or both of primary fuel source 20 and/or alternate fuel source 40 allows for the separate and accurate metering of primary fuel 21 and secondary fuel 41, as may be required for RIN extraction.

In effect, flow cells 70 and 270 serve as a surrogate fuel sources for an engine designed to accept a dual fuel supply source, providing both a source of differentiated fuel types and the capability to accept separate bypass, therefore preserving differentiation and neatness, as may be required for RIN extraction and/or compliance with neat mode operation if prescribed by RIN number or equivalent, other regulatory use restrictions, or user preference.

Flow cells 70 and 270 also includes respective vent ports 62 and 262 to allow for the free creation and removal of ullage within the volume of flow cells 70 and 270, and to maintain the volume within flow cells 70 and 270 at a lower pressure than fuel source and bypass source to promote flow. Vent ports 62 and 262 may be vented to atmosphere. Alternately, vent ports 62 and 262 may be routed to an activated carbon canister, routed proximate to engine air intake for scavenge, and/or maintained at engine vacuum; these and other methods common to those skilled in the art being intended to mitigate vapor release into the atmosphere.

It should be noted that since the ullage within flow cells 70 and 270 are nominally maintained at atmospheric pressure or slight vacuum, and furthermore ideally at the same pressure as the ullage within primary fuel storage 20 and alternate fuel storage 40 via a common vent manifold, pumps 29 and 49, valves and other common components likewise effectively work against slight vacuum, zero or minimal pressure, thus simplifying their design requirements, extending their useful life, and reducing system cost.

Within the embodiment of control system 9 depicted in FIG. 9, electronic controller 90 utilizes volume data derived from primary fuel measurement device 36 and alternate fuel measurement device 56 for extraction of RINs and/or determination of tax credits and/or subsidies, as allowed and as applicable.

Also within the embodiment of control system 9 depicted in FIG. 9, electronic controller 90 utilizes blend ratio data derived from engine 190 via signal line(s) 140. Alternately, or in conjunction, electronic controller 90 may specify the desired blend ratio to engine 190 via signal line(s) 141, or may provide direct injector timing and/or control of engine 190, thus effecting desired blend ratio. Said blend ratio is coupled with primary fuel 21 and alternate fuel 41 volume derived from primary fuel measurement device 36 and alternate fuel measurement device 56 for extraction of RINs and/or determination of tax credits and/or subsidies, as allowed and as applicable. Alternately, electronic controller 90 may specify neat mode utilization if prescribed by RIN number or equivalent, other regulatory use restrictions, or user preference, by mandating blend ratios of 0:100% or 100:0%.

Figure 10:
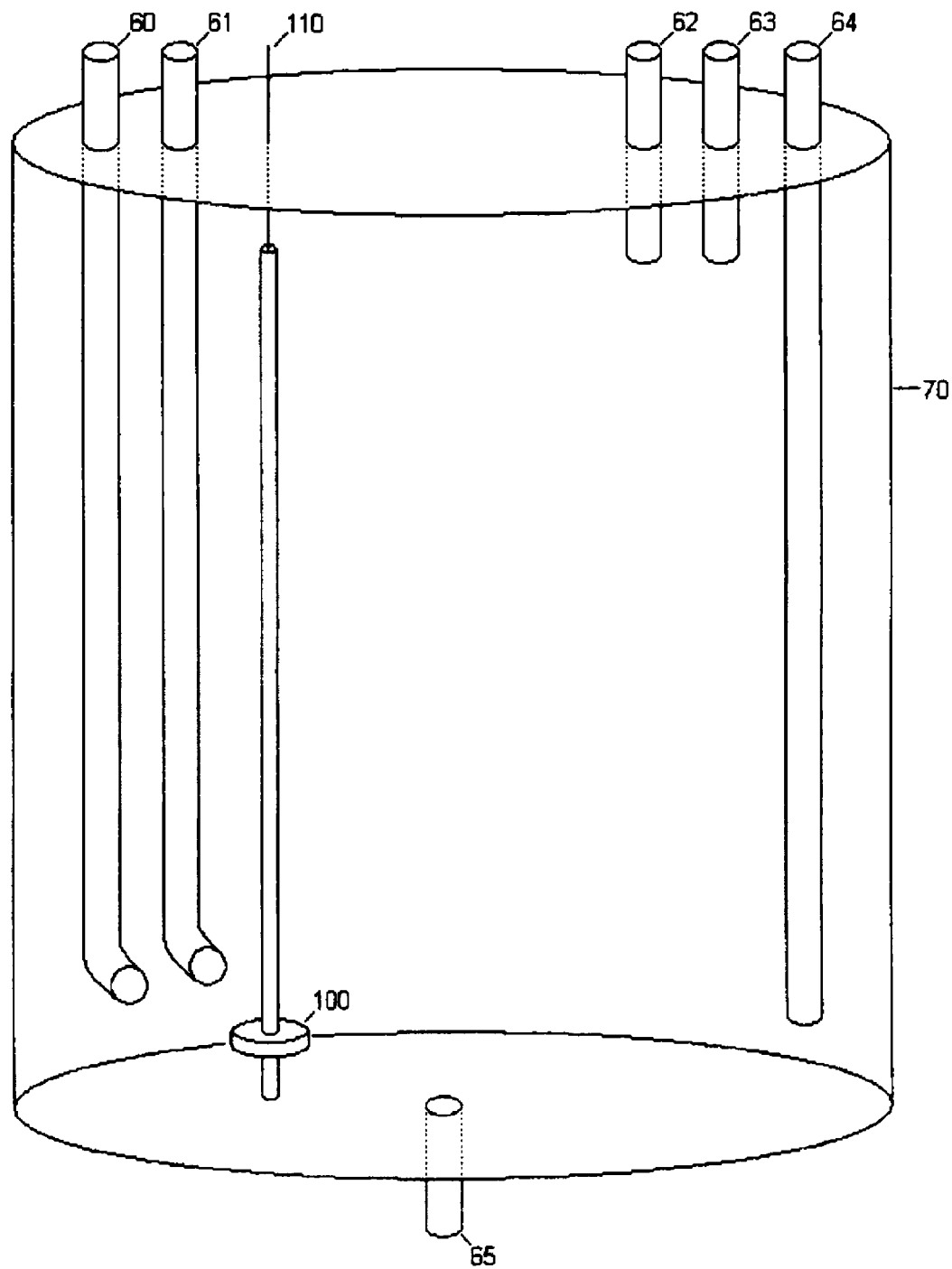
FIG. 10 is a schematic diagram of a flow cell according to an embodiment of the present invention, the flow cell shown ascertaining quantity of fuel within by a volume sensor.

Referring now to the drawings and, in particular, to FIG. 10, there is shown a fuel flow cell system 10 comprising flow cell 70 as was referenced by various embodiments and examples preceding.

Within the embodiment of flow cell system 10 depicted in FIG. 10, flow cell 70 serves to provide a limited reservoir of fuel for engine consumption, serving a both sourcing point of single fuel type, selected fuel type and/or blended fuel to the engine fuel system and also for the acceptance and receipt of engine fuel bypass, if and as required.

Flow cell 70 includes at least one fuel inlet. Two fuel inlets, specifically fuel inlet line 60 and fuel inlet line 61, are present as depicted in FIG. 10. Said inlets may introduce fuel into the volume of flow cell 70 in many manners, however it is desired to shape and/or place such inlets as to encourage mixing, if and as required, and to also ameliorate foaming and/or air entrainment within fuel.

Flow cell 70 includes at least one fuel outlet. One fuel outlet, specifically fuel outlet line 64, is depicted in FIG. 10. Said outlets may remove fuel from the volume of flow cell 70 in many manners, however it is desirable to shape and/or place such outlets as to permit extraction with minimal volume of fuel remaining within flow cell 70, however also as not to allow water, if present, to extracted by the outlet, but instead be allowed to separate to the bottom of flow cell 70 by virtue of higher density under the effect of gravity, such that any water may accumulate to limited degree before being at risk of being extracted by fuel outlet line 64.

Flow cell 70 may include at least one bypass fuel return inlet. One bypass fuel return inlet, specifically bypass fuel return inlet line 63, is depicted in FIG. 10. Said bypass fuel return inlets may reintroduce bypassed fuel into the volume of flow cell 70 in many manners, however it is desired to shape and/or place such inlets as to both encourage mixing if required, and to also ameliorate foaming and/or air entrainment within fuel.

Flow cell 70 may include at least one vent to maintain the ullage within flow cell 70 at atmospheric pressure, other desired pressure or vacuum, or for scavenge of vapor, if any. One venting method, specifically vent port line 62, is depicted in FIG. 10. Said venting may of flow cell 70 may be accomplished in many manners, however it is desired to shape and/or place such venting as to prevent fuel introduction, and instead only expose the vent to ullage space within flow cell 70 under normal operation conditions.

Flow cell 70 may include at least one drain for the removal of water as may become entrained within fuel yet separated by density and gravity, or the removal of sum contents for servicing. One drainage method, specifically drain line 65, is shown in FIG. 10. Said drainage may be performed in many manners, however it is desirable to place the drain outlet at the lowest gravitational point within flow cell 70, and furthermore that the bottom surface of flow cell 70 be conical or sloped as to further facilitate drainage of density and/or gravity separated media. In normal construct, drain line 65 connects to a valve that remains closed during normal operation, and manually and/or automatically opened, if and as required.

Also within the embodiment of flow cell system 10 depicted in FIG. 10, flow cell 70 includes volume measurement device 100 with output signal line 110. Volume measurement device 100 may any device suitable for direct or inferential volume measurement, including but not limited to float, Archimedes principal, mass of fuel, or tare mass of fuel and flow cell combined. Volume measurement device 100 may be continuous in its measurement, or quantized. Volume measurement device 100 may also provide linear and/or digital output via signal line 110.

An electronic controller may input the volume contained or rate of volume change within flow cell 70 as indicated by measurement device 100 via signal line 110 to maintain a sufficient reservoir of neat, selected or blended fuel for engine consumption as demanded by the engine.

An electronic controller may by delivery of a single fuel type or sequential delivery of a primary fuel and an alternate fuel ascertain the volume of fuel transferred to flow cell 70 by measurement device 100 via signal line 110 to for a variety of control metric, financial and regulatory purposes, including but not limited to a feedback mechanism for effecting the desired blend ratio, the tabulation of primary fuel and alternate fuel metered, the ratio of blend at which it occurred, or verification of neat operation if prescribed.

Figure 11:
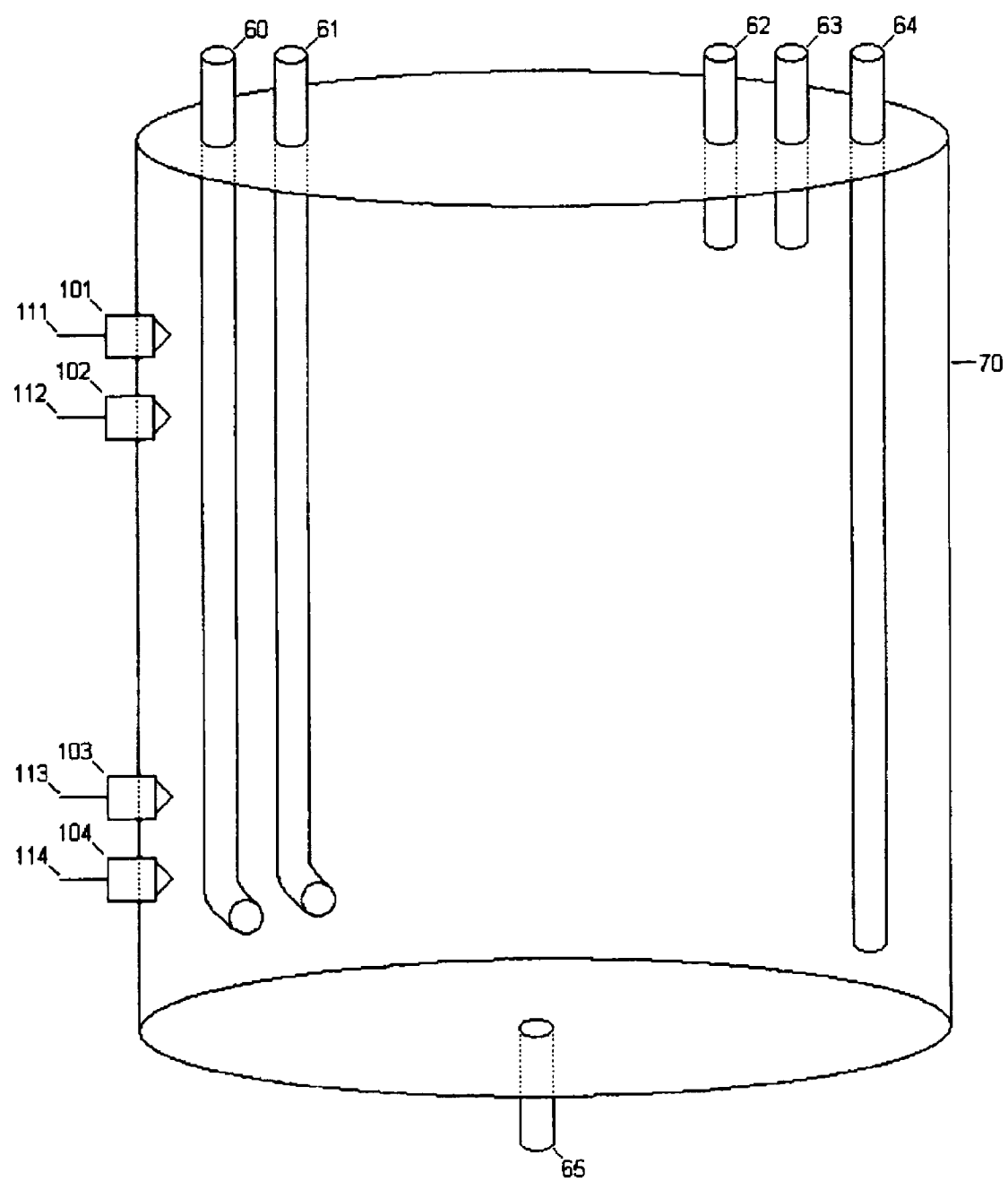
FIG. 11 is a schematic diagram of a flow cell according to an embodiment of the present invention, the flow cell shown ascertaining quantity of fuel within by at least one discrete volume sensor.

Referring now to the drawings and, in particular, to FIG. 11, there is shown a fuel flow cell system 11 comprising flow cell 70 as was referenced by the embodiments and examples preceding.

Unless otherwise specifically stated, fuel flow cell system 11 depicted in FIG. 11 inherits identical elements and corresponding functional descriptions as fuel flow cell system 10 depicted in FIG. 10, with like numbers referring to like elements throughout.

The fuel flow cell system 11 depicted in FIG. 11 differs from fuel control system 10 depicted in FIG. 10 in that measurement device 100 has been deleted and replaced by a at least one level detection devices to ascertain volume by displacement of fuel within flow cell 70. Four such level detection devices are shown in FIG. 11, specifically level detection devices 101, 102, 103 and 104.

While identical functionality can be obtained via measurement device 100 from fuel control system 10 depicted in FIG. 10, a plurality of level detection devices 101, 102, 103 and 104 within fuel flow cell system 11 depicted in FIG. 11 allow the implementation of a simplified fuel cell volume control method whereby volume is maintained within predetermined quantized levels, specifically as bounded by level sensor 103 as a minimum volume, and level sensor 102 as a maximum volume. As an example, as fuel is removed from flow cell 70 via fuel output line 64, at some point the fuel level will fall beneath level detection device 103, as communicated to an electronic controller via signal line 113, whereupon fuel of single fuel type, or sequential or simultaneous delivery of a primary fuel and an alternate fuel may be effected via fuel inlet lines 60 and/or 61 until level sensor 102, as communicated to an electronic controller via signal line 112, indicates a maximum volume has been achieved. As fuel is again removed from flow cell 70 via fuel output line 64, at some point the fuel level will again fall beneath level detection device 103, whereupon the cycle is repeated. And so on.

Level detection device 104, as communicated to an electronic controller via signal line 114, may be employed to detect the failure of level detection device 103, thus preventing flow cell 70 depletion of fuel. Level detection device 104, as communicated to an electronic controller via signal line 114, may further serve as a substitute for level detection device 103 until repair is made, thus allowing continued use of system operation.

Similarly, level detection device 101, as communicated to an electronic controller via signal line 111, may be employed to detect the failure of level detection device 102, thus preventing flow cell 70 overflow. Level detection device 101, as communicated to an electronic controller via signal line 111, may further serve as a substitute for level detection device 102 until repair is made, thus allowing continued use of system operation.

Figure 12:
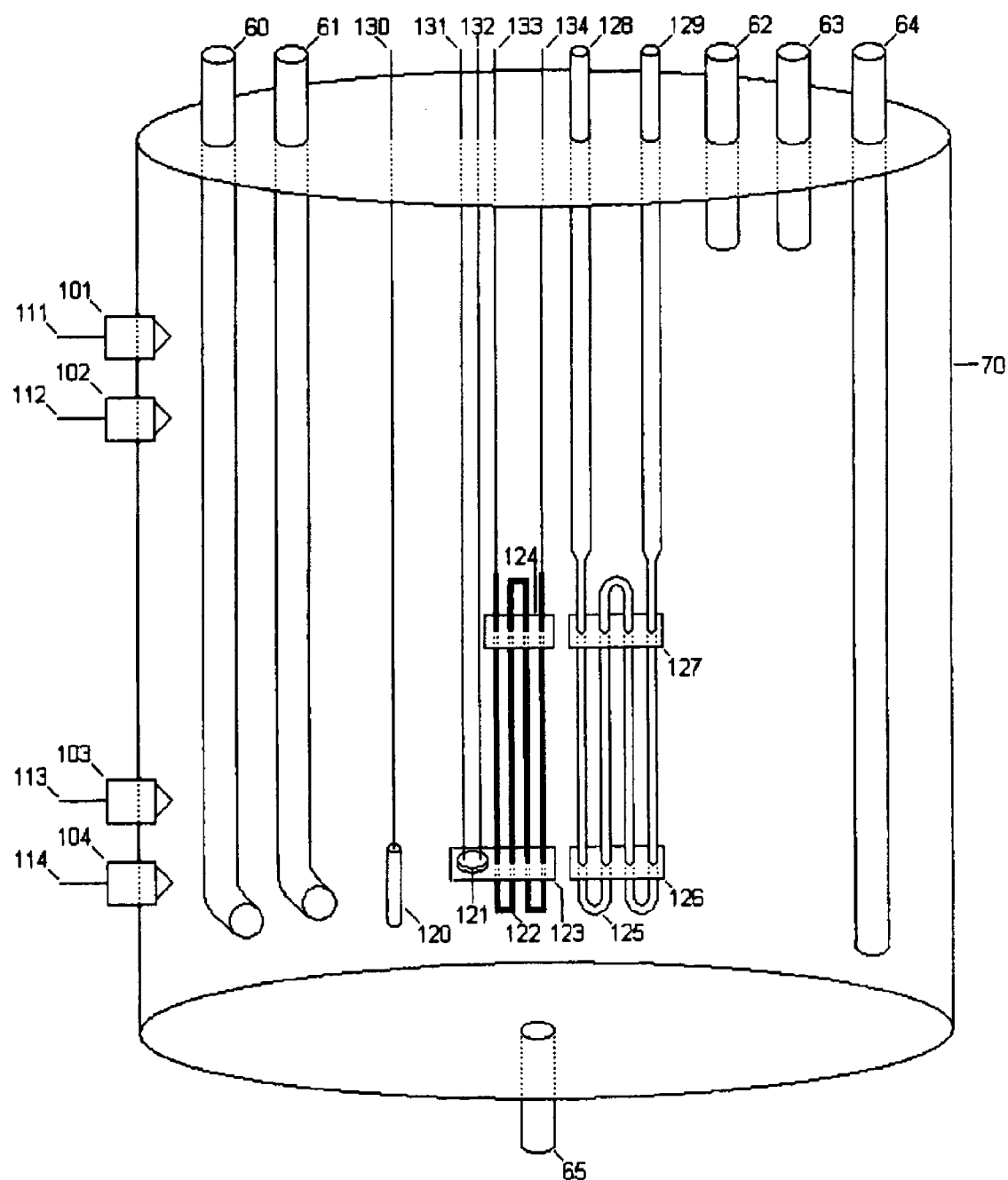
FIG. 12 is a schematic diagram of a flow cell according to an embodiment of the present invention, introducing various thermal management methods.

Referring now to the drawings and, in particular, to FIG. 12, there is shown a fuel flow cell system 12 comprising flow cell 70.

Unless otherwise specifically stated, fuel flow cell system 12 depicted in FIG. 12 inherits identical elements and corresponding functional descriptions as fuel flow cell system 10 depicted in FIG. 10 and as fuel flow cell system 11 depicted in FIG. 11, with like numbers referring to like elements throughout.

The fuel flow cell system 12 depicted in FIG. 12 serves to introduce thermal management elements to flow cell 70, said thermal management being desirable in that the viscosity of diesel fuel and especially some alternate fuels may fall above a usable viscosity if allowed to reach low temperatures as may be experienced within weather exposed, unheated structure, or vehicle engine compartments.

The flow cell may include fuel temperature sensor 120, as communicated to an electronic controller via signal line 130.

The flow cell may also include heat exchanger 125, sourced and scavenged via coolant lines 128 and 129. The term "coolant", as used here, while counterintuitive in name, is nevertheless common parlance for a liquid transporting thermal energy, useful both as a source of thermal energy and to remove thermal energy. Coolant flow may be further controlled by valves or thermostats as desired to maintain a predetermined fuel temperature within flow cell 70, albeit varying in accordance with the thermal mass of expected fuel introduction and removal occurring within flow cell 70 during normal operation. Heat exchanger efficiency may be enhanced by increased surface area, such as at least one fin, fins 126 and 127 being shown in FIG. 12. Heat exchanger 125 may be freestanding, or made part of flow cell 70 construct to increase surface area.

The flow cell may also include an electrical heat source 122, serving the same function as heat exchanger 125, said heat source 122 capable of operating in absence of, individually with, or in tandem with heat exchanger 125. Since heat source 122 is electrical, no engine coolant heat and therefore no prior engine operation are required before the transfer of heat to fuel within flow cell 70 may initiate. Heat source 122 is further is useful to preheat fuel within flow cell 70, and thus allow flow cell 70 to be maintained continuously ready. Heat exchanger efficiency may be enhanced by increased surface area, such as at least one fin, fins 123 and 124 being shown in FIG. 12. Since electrical elements by nature may exhibit thermal runaway should the media to which heat energy is being transferred be removed or absent, temperature sensor 121 may be provided to maintain regulation of the element in such case. Temperature sensor 121 may be thermostatic and designed to electrically open at a predetermined temperature, and may simply be wired in series with heating element 122 via lines 131 and 132. Heat exchanger 122 may be freestanding, or made part of flow cell 70 construct to increase surface area.

Flow cell 70 may also include thermal insulation or barrier, not shown in FIG. 12. Thermal insulation methods may include an interstitial space.

Figure 13:
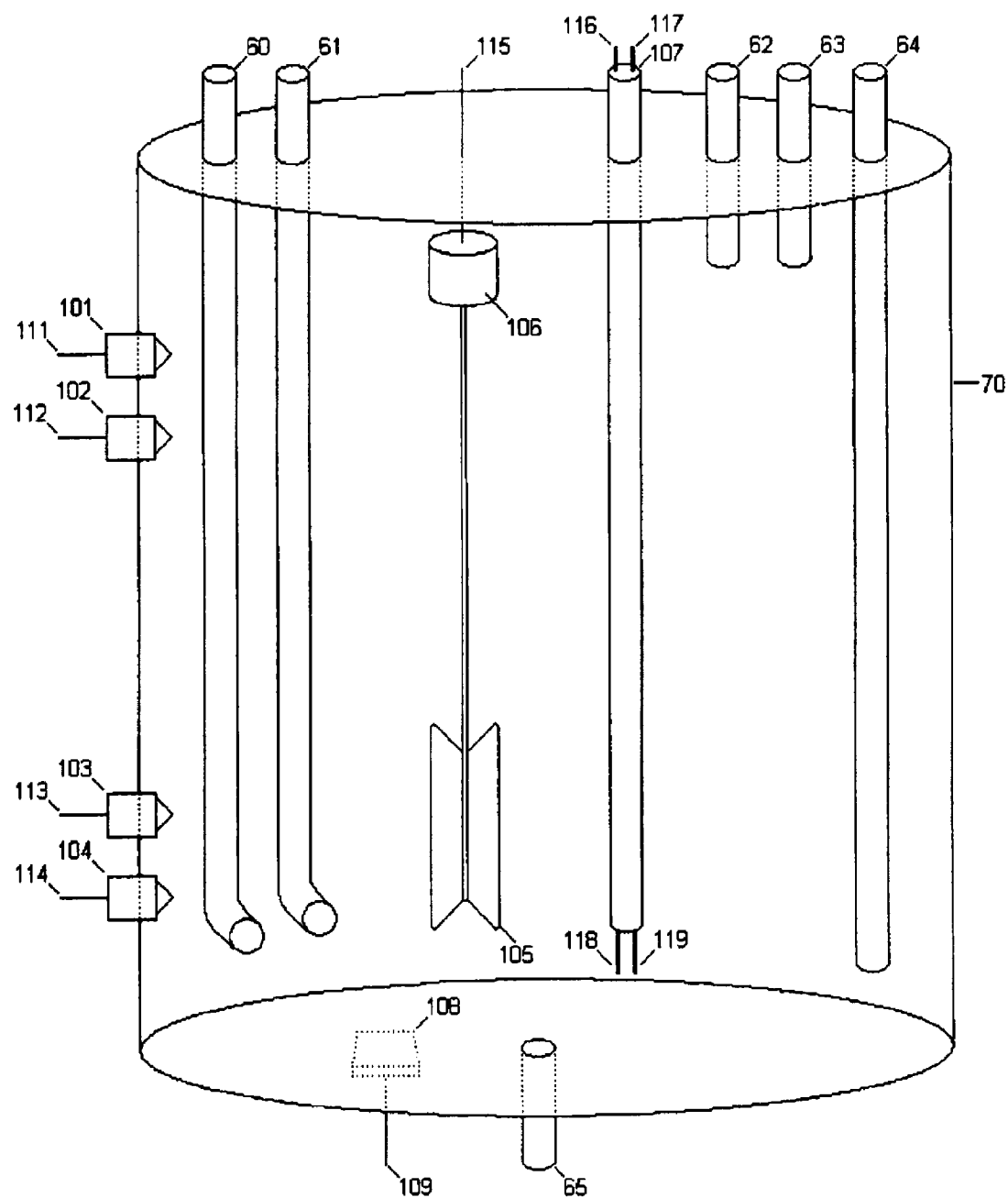
FIG. 13 is a schematic diagram of a flow cell according to an embodiment of the present invention, introducing mixing methods and contamination detection.

Referring now to the drawings and, in particular, to FIG. 13, there is shown a fuel flow cell system 13 comprising flow cell 70.

Unless otherwise specifically stated, fuel flow cell system 13 depicted in FIG. 13 inherits identical elements and corresponding functional descriptions as fuel flow cell system 10 depicted in FIG. 10, as fuel flow cell system 11 depicted in FIG. 11, and as fuel flow cell system 12 depicted in FIG. 12, with like numbers referring to like elements throughout.

The fuel flow cell system 13 depicted in FIG. 13 serves to introduce rheological elements and water detection, said rheological elements being desirable in promoting thorough and/or uniform mixing of primary fuel 21 and alternate fuel 41 within flow cell 70, and said water detection elements being useful for the detection of entrained water within fuel that has by nature tendency to separate by gravity and collect in topographically low points and/or volumes, as provided within flow cell 70.

The flow cell may include ultrasonic mixing driver 108 as controlled by signal line 109. Ultrasonic mixing driver 108 serves to promote uniform mixing when a primary fuel and an alternate fuel are present.

The flow cell may include vane 105, as driven by motor 106, and as controlled by signal line 115. Vane 105 serves to promote uniform mixing when a primary fuel and an alternate fuel are present.

While FIG. 13 shows examples of acoustical and mechanical mixing, there is nothing to preclude other active and passive rheological mixing methods, in substitution or in tandem, including but not limited to physical features such as convolutions within flow cell 70.

The flow cell may include a water sensing element. FIG. 13 depicts water sensing element 107 with conductivity sensing elements 118 and 119, where said conductivity is conveyed to an electronic controller via signal lines 116 and 117.

Figure 14:
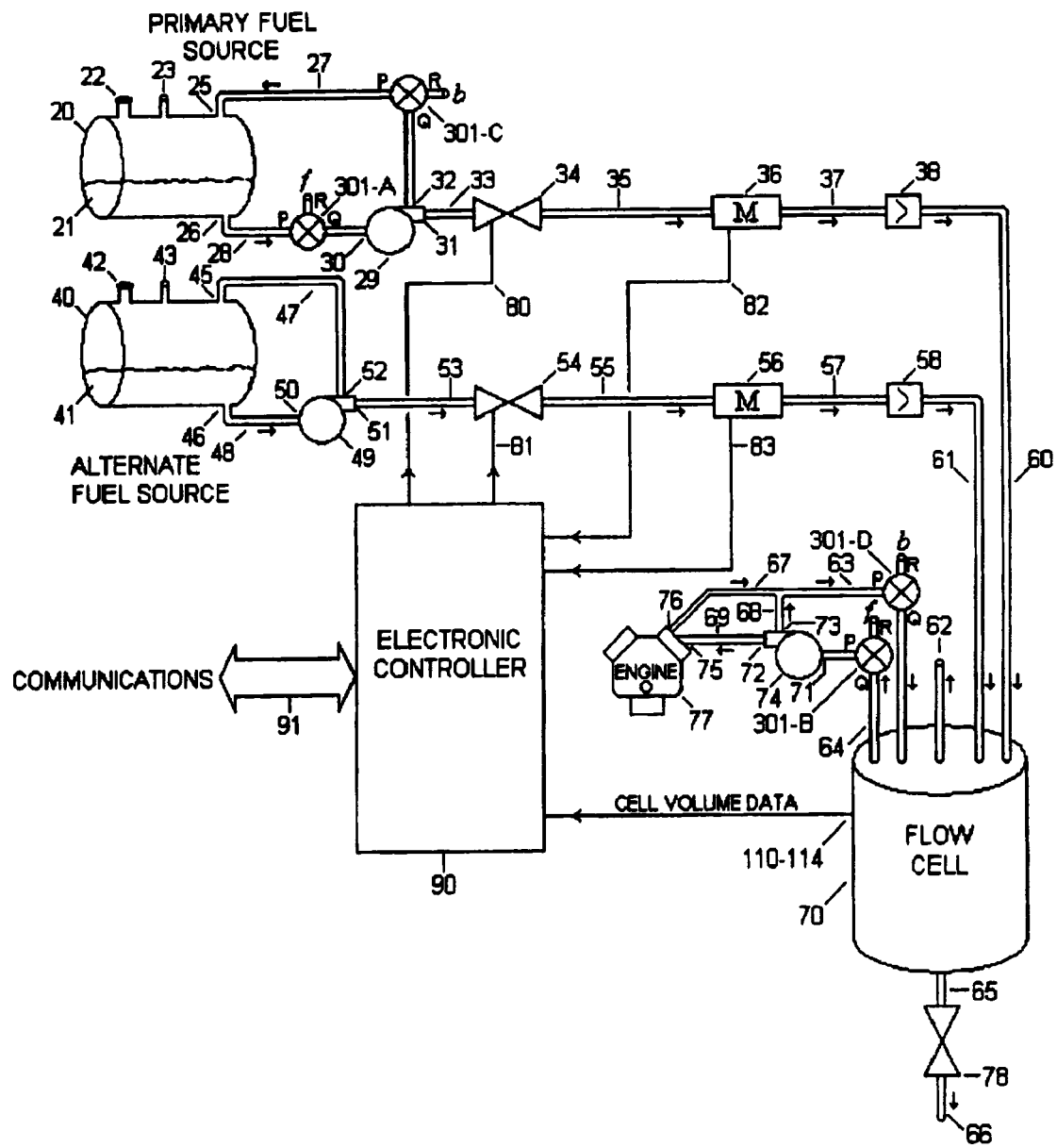
FIG. 14 is a schematic diagram of a bypassed alternate fuel blending system according to an embodiment of the present invention, whereby the alternate fuel blending system has been functionally removed to illustrate simplicity of system insertion and removal within an engine and engine fuel system originally designed to operate on a primary fuel.

While FIG. 13 shows as example electrical conductivity water sensor 107, there is nothing to preclude other sensing methods, including but not limited to detection by simple float device of specific density greater than fuel but less than water. Referring now to the drawings and, in particular, to FIG. 14, there is shown a bypassed alternate fuel blending system 14, whereby the alternate fuel blending system has been functionally removed with primary fuel 21 directly sourcing pump 74 via primary fuel line 28, and bypass return line 27 directly returning engine 77 bypass fuel to primary fuel storage source 20. FIG. 14 serves to illustrate that the utilization of flow cell methodology as described herein provides both similar source point as primary fuel storage source 20, and also similar bypass return impedance as primary fuel storage 20. Therefore, by simple change of connection, or more preferably the insertion of a control valve 301, a four-section three-port valve operated in tandem, the alternate fuel blending system described herein may be easily and cost effectively switched out of the system if and as required by deselecting flow via ports P-Q and instead selecting flow via ports P-R. As an example, the alternate fuel blending system may be manually or automatically switched out due to component failure or other malfunction. While the utilization of alternate fuel 41 is forfeited, nevertheless the engine-dependent application may continue to function on primary fuel 21 until such time repair is made.

Many modifications and other embodiments of the inventions set forth herein will come to mind to one skilled in the art to which this invention pertains having the benefit of the teachings presented in the foregoing descriptions and associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

We claim:

1. A fuel control system for controlling delivery of a primary and an alternate fuel to an internal combustion engine of a vehicle via dedicated flow cells to prevent cross-contamination of primary and alternate fuel sources before blending, comprising:

a primary fuel flow controller that controls delivery of the primary fuel from a primary fuel source to a primary fuel flow path;
an alternate fuel flow controller that controls delivery of the alternate fuel from an alternate fuel source to an alternate fuel flow path;
an electronic controller coupled to the primary fuel flow controller and the alternate fuel flow controller, wherein the electronic controller is adapted to control the primary fuel flow controller to control delivery of the primary fuel in the primary fuel flow path to a primary fuel flow cell and control the alternate fuel flow controller to control delivery of the alternate fuel in the alternate fuel flow path to an alternate fuel flow cell;
wherein the primary fuel flow cell comprises:
 a first inlet port adapted to receive the primary fuel from the primary fuel flow path;
 a first outlet port adapted to supply the primary fuel inside the primary fuel flow cell to an engine for consumption; and
 a first bypass inlet port adapted to receive excess primary fuel previously received from the first outlet port that was not consumed by the engine, such that the excess primary fuel is not returned to the primary fuel source; and
wherein the alternate fuel flow cell comprises:
 a second inlet port adapted to receive the alternate fuel from the alternate fuel flow path;
 a second outlet port adapted to supply the alternate fuel inside the alternate fuel flow cell to the engine for consumption; and
 a second bypass inlet port adapted to receive excess alternate fuel previously received from the second outlet port that was not consumed by the engine, such that the excess alternate fuel is not returned to the alternate fuel source;
wherein the primary fuel from the primary fuel flow cell and the alternate fuel from the alternate fuel flow cell are mixed at the engine.

2. The fuel control system of claim 1, further comprising:
a primary fuel metering device coupled to the electronic controller and adapted to measure a volume of the primary fuel delivered to the primary fuel flow cell; and
an alternate fuel metering device coupled to the electronic controller and adapted to measure a volume of the alternate fuel delivered to the alternate fuel flow cell,
wherein the electronic controller is adapted to control the primary fuel flow controller and the alternate fuel flow controller to provide a desired blend ratio of the primary fuel and the alternate fuel to the engine based a signal from the engine.

3. The fuel control system of claim 2, wherein the electronic controller is further adapted to determine a financial incentive available for use of the alternate fuel based on the volume of the alternate fuel delivered to the alternate fuel flow cell.

4. The fuel control system of claim 2, wherein the electronic controller is further adapted to extract at least one RIN from RIN information received for the alternate fuel delivered to the alternate fuel source based on the volume of alternate fuel measured by the alternate fuel metering device.

* * * * *